(12) United States Patent
Griffin et al.

(10) Patent No.: US 12,223,390 B2
(45) Date of Patent: Feb. 11, 2025

(54) ENTANGLEMENT OF QUBITS ALLOCATED TO DIFFERENT QUANTUM ISOLATION ZONES

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

(*) Notice: Subject to any disclaimer, the term of this patent is extended or adjusted under 35 U.S.C. 154(b) by 377 days.

(21) Appl. No.: 17/538,211

(22) Filed: Nov. 30, 2021

(65) Prior Publication Data

US 2023/0169376 A1 Jun. 1, 2023

(51) Int. Cl.
*G06N 10/00* (2022.01)
*G06F 9/48* (2006.01)

(52) U.S. Cl.
CPC ............ *G06N 10/00* (2019.01); *G06F 9/485* (2013.01)

(58) Field of Classification Search
CPC ......... G06N 10/00; G06N 10/80; G06F 9/485
See application file for complete search history.

(56) References Cited

U.S. PATENT DOCUMENTS

| | | | |
|---|---|---|---|
| 7,853,011 B2 | 12/2010 | Kuang et al. | |
| 8,885,828 B2 | 11/2014 | Wiseman et al. | |
| 9,294,272 B2 | 3/2016 | Lutkenhaus et al. | |
| 9,870,273 B2 | 1/2018 | Dadashikelayeh et al. | |
| 10,733,522 B2 | 8/2020 | Curtis et al. | |
| 11,379,752 B1* | 7/2022 | Griffin | G06N 10/80 |
| 11,556,835 B1* | 1/2023 | Coady | G06N 10/80 |
| 11,558,069 B1* | 1/2023 | Sparrow | G06N 10/20 |
| 2003/0014522 A1* | 1/2003 | McBrearty | G06F 11/2097 714/E11.073 |
| 2012/0124432 A1 | 5/2012 | Pesetski et al. | |
| 2015/0154147 A1 | 6/2015 | Alboszta et al. | |
| 2017/0141286 A1 | 5/2017 | Kerman | |
| 2018/0062764 A1 | 3/2018 | Borrill | |
| 2019/0179530 A1* | 6/2019 | Chen | G06F 3/0631 |
| 2019/0205783 A1* | 7/2019 | Nam | G06N 10/00 |
| 2019/0332731 A1 | 10/2019 | Chen et al. | |

(Continued)

FOREIGN PATENT DOCUMENTS

| | | |
|---|---|---|
| CN | 101888276 A | 11/2010 |
| CN | 107317676 B | 5/2020 |

(Continued)

OTHER PUBLICATIONS

Arrazola, J.M. et al., "Quantum circuits with many photons on a programmable nanophotonic chip," arXiv:2103.02109v1 [quant-ph], Mar. 3, 2021, 21 pages.

(Continued)

*Primary Examiner* — Stacy Whitmore
(74) *Attorney, Agent, or Firm* — Dority & Manning, P.A.

(57) ABSTRACT

A quantum isolation zone (QIZ) controller executing on a quantum computing system receives, from a first requestor, a first request to entangle a first qubit allocated to a first QIZ and a second qubit allocated to a second QIZ, the first qubit not being accessible to any quantum processes associated with the second QIZ. Qubit metadata is modified to establish an entanglement zone that encompasses the first qubit and the second qubit. The QIZ controller initiates an entanglement process to entangle the first qubit and the second qubit.

20 Claims, 16 Drawing Sheets

(56) References Cited

U.S. PATENT DOCUMENTS

| | | | |
|---|---|---|---|
| 2020/0167515 A1 | 5/2020 | Pednault et al. | |
| 2020/0167685 A1 | 5/2020 | Thom et al. | |
| 2020/0184031 A1 | 6/2020 | Horii | |
| 2020/0201655 A1* | 6/2020 | Griffin | G06F 9/4494 |
| 2020/0394544 A1 | 12/2020 | Low et al. | |
| 2021/0097419 A1 | 4/2021 | Limberg et al. | |
| 2021/0124640 A1* | 4/2021 | Nickerson | G06N 10/70 |
| 2021/0152189 A1 | 5/2021 | Murali et al. | |
| 2021/0374583 A1* | 12/2021 | Griffin | G06F 9/5022 |
| 2021/0406748 A1* | 12/2021 | Coady | G06F 16/162 |
| 2022/0094341 A1* | 3/2022 | Pellerano | H03K 3/38 |
| 2022/0164253 A1 | 5/2022 | On et al. | |
| 2022/0383171 A1* | 12/2022 | Griffin | G06F 1/3203 |
| 2022/0383172 A1* | 12/2022 | Griffin | G06N 10/80 |
| 2022/0383176 A1* | 12/2022 | Griffin | G06F 9/5027 |
| 2023/0153148 A1* | 5/2023 | Griffin | G06F 9/4843 718/102 |

FOREIGN PATENT DOCUMENTS

| | | |
|---|---|---|
| CN | 108960435 B | 6/2020 |
| KR | 102231130 B1 | 3/2021 |
| WO | 2020081805 A1 | 4/2020 |

OTHER PUBLICATIONS

Goyeneche, D. et al., "Genuinely multipartite entangled states and orthogonal arrays," arXiv:1404.3586v2 [quant-ph], Jul. 18, 2014, 24 pages.

Goyal, K., "Using Graph States for Quantum Computation and Communication," Thesis In Partial Fulfillment of the Requirements for the Degree of Doctor of Philosophy, California Institute of Technology, Pasadena, California, May 27, 2009, 95 pages.

Hahn, F. et al., "Quantum network routing and local complementation," Quantum Information, vol. 5, No. 76, Sep. 2019, Nature Partner Journals, 7 pages.

Honrubia, E. et al., "Graph Approach to Quantum Teleportation Dynamics," Quantum Reports, vol. 2, Jul. 2020, MDPI, pp. 352-377.

Mina, M. et al., "EntangleNet: Theoretical Reestablishment of Entanglement in Quantum Networks, " Applied Sciences, vol. 8, Oct. 2018, No. 1935, MDPI, 17 pages.

Saggio, V. et al., "Experimental quantum speed-up in reinforcement learning agents," arXiv:2103.06294v1 [quant-ph], Mar. 10, 2021, 10 pages.

Salazar, R. et al., "Optimal allocation of quantum resources," arXiv:2006.16134v2 [quant-ph], Jul. 5, 2020, 13 pages.

Stahlke, D. et al., "Quantum zero-error source-channel coding and non-commutative graph theory," arXiv:1405.5254v2 [quant-ph], Oct. 18, 2015, 24 pages.

Notice of Allowance for U.S. Appl. No. 17/552,594, dated Jun. 26, 2024, 18 pages.

Non-Final Office Action for U.S. Appl. No. 17/530,121, dated May 2, 2024, 20 pages.

Notice of Allowance for U.S. Appl. No. 17/552,594, dated Oct. 17, 2024, 9 pages.

Final Office Action for U.S. Appl. No. 17/530,121, dated Nov. 1, 2024, 15 pages.

\* cited by examiner

ENTANGLEMENT OF QUBITS ALLOCATED TO DIFFERENT QUANTUM ISOLATION ZONES

BACKGROUND

Quantum computing utilizes qubits to perform quantum calculations. Qubits are finite resources. As quantum computing continues to increase in popularity and become more commonplace, an ability to programmatically coordinate access to qubits will be desirable.

SUMMARY

The examples disclosed herein implement entanglement of qubits allocated to different quantum isolation zones. In particular, the examples facilitate cross-isolation zone entanglement of qubits by implementing an entanglement zone that encompasses qubits in multiple QIZs.

In one example a method is provided. The method includes receiving, by a quantum isolation zone (QIZ) controller executing on a quantum computing system from a first requestor, a first request to entangle a first qubit allocated to a first QIZ and a second qubit allocated to a second QIZ, the first qubit not being accessible to any quantum processes associated with the second QIZ. The method further includes modifying qubit metadata to establish an entanglement zone that encompasses the first qubit and the second qubit. The method further includes initiating, by the QIZ controller, an entanglement process to entangle the first qubit and the second qubit.

In another example a quantum computing system is provided. The quantum computing system includes a memory and a processor device coupled to the memory. The processor device is to receive, from a first requestor, a first request to entangle a first qubit allocated to a first QIZ and a second qubit allocated to a second QIZ, the first qubit not being accessible to any quantum processes associated with the second QIZ. The processor device is further to modify qubit metadata to establish an entanglement zone that encompasses the first qubit and the second qubit. The processor device is further to initiate, by the QIZ controller, an entanglement process to entangle the first qubit and the second qubit.

In another example a non-transitory computer-readable storage medium is provided. The non-transitory computer-readable storage medium includes executable instructions to cause a processor device on a quantum computing system to receive, from a first requestor, a first request to entangle a first qubit allocated to a first QIZ and a second qubit allocated to a second QIZ, the first qubit not being accessible to any quantum processes associated with the second QIZ. The instructions further cause the processor device to modify qubit metadata to establish an entanglement zone that encompasses the first qubit and the second qubit. The instructions further cause the processor device to initiate, by the QIZ controller, an entanglement process to entangle the first qubit and the second qubit.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
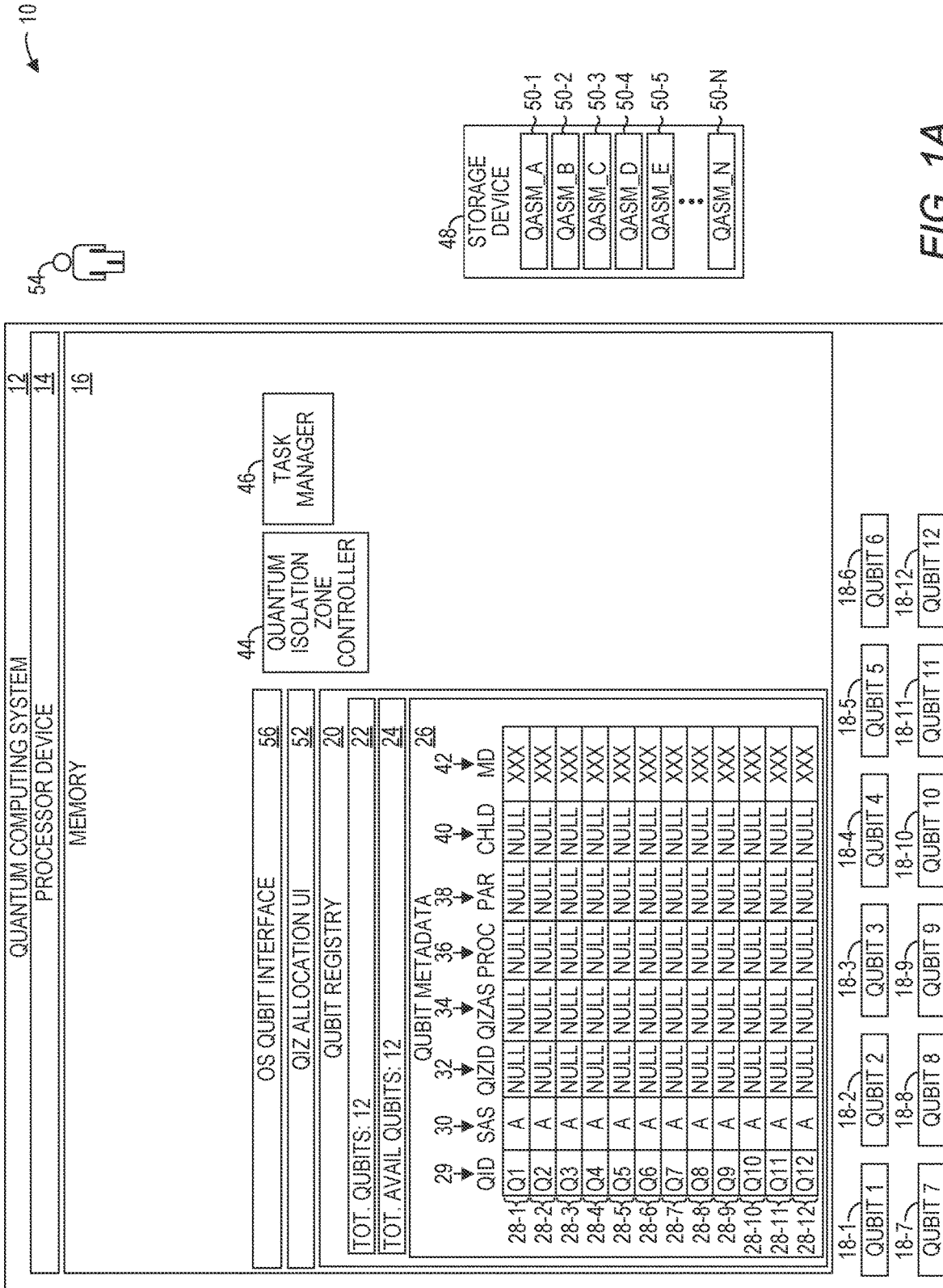
FIGS. 1A-1F are block diagrams of an environment, at successive points in time, in which quantum isolation zones can be practiced according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing utilizes qubits to perform quantum calculations. Qubits are finite resources, but as the technology evolves, quantum computing systems are implementing larger and larger numbers of qubits. As quantum computing continues to increase in popularity and become more commonplace, it is increasingly important for the operating system to control access to qubits to, for example, ensure that one quantum process does not inadvertently access a qubit utilized by another quantum process, ensure that qubits containing private information can only be accessed by quantum processes that should have access to such private information, and to generally isolate one quantum process from another quantum process.

The examples disclosed herein implement quantum isolation zones (QIZs) that ensure a quantum process can only access qubits allocated to the QIZ in which the quantum process executes, and has no visibility to or ability to access qubits allocated to other QIZs or that are otherwise implemented on the quantum computing system. The examples also implement quantum process relationship graphs that facilitate visibility of qubits by a plurality of quantum processes that execute within a QIZ and that have relationships with one another. A first quantum process executing in a QIZ that is not related to a second quantum process executing in the same QIZ has no visibility to the qubits allocated to the second quantum process. Thus, the examples facilitate isolation even within the same QIZ, or qubit sharing within the same QIZ among related quantum processes.

Additional examples disclosed herein implement entanglement of qubits allocated to different QIZs. In particular, the examples facilitate cross-isolation zone entanglement of qubits by implementing an entanglement zone that encompasses qubits in multiple QIZs. A request is received to entangle a first qubit in a first QIZ and a second qubit in a second QIZ. Qubit metadata is modified to establish an entanglement zone that encompasses the first qubit and the second qubit. An entanglement process is initiated to entangle the first qubit and the second qubit. The establishment of the entanglement zone inhibits subsequent access to the first qubit and the second qubit while entangled. Subsequently, the entanglement process may end, leaving data useful for quantum processes in both the first QIZ and the second QIZ.

FIGS. 1A-1F are block diagrams of an environment, at successive points in time, in which QIZs can be practiced according to one implementation. Referring first to FIG. 1A, the environment 10 includes a quantum computing system 12 that operates in a quantum environment but can operate using classical computing principles or quantum computing principles. When using quantum computing principles, the quantum computing system 12 performs computations that utilize quantum-mechanical phenomena, such as superposition and entanglement. The quantum computing system 12 may operate under certain environmental conditions, such as at or near 0° Kelvin. When using classical computing principles, the quantum computing system 12 utilizes binary digits that have a value of either 1 or 0.

The quantum computing system 12 includes at least one processor device 14 and at least one memory 16. The quantum computing system 12 implements twelve qubits 18-1-18-12 (generally, qubits 18). The quantum computing system 12 includes a qubit registry 20 that maintains information about the qubits 18-1-18-12, including, by way of non-limiting example, a total qubits counter 22 that identifies the total number of qubits 18 implemented by the quantum computing system 12 and a total available qubits counter 24 that maintains count of the total number of qubits 18 that are currently available for allocation.

The qubit registry 20 also maintains qubit metadata 26, which comprises a plurality of metadata records 28-1-28-12 (generally, metadata records 28), each of which maintains information about a corresponding qubit 18-1-18-12. Each metadata record 28 includes a qubit identifier (QID) 29 that contains an identifier of the qubit 18-1-18-12 to which the respective metadata record 28 corresponds, a system availability status (SAS) 30 that identifies whether the corresponding qubit 18 is available for allocation at the quantum computing system level, a QIZ identifier (QIZID) 32 that identifies the QIZ, if any, to which the corresponding qubit 18 has been allocated, and a QIZ availability status (QIZAS) 34 that identifies whether the corresponding qubit 18, if allocated to a QIZ, is available in the QIZ or has been allocated to a quantum process executing in the QIZ. Each metadata record 28 also includes a process identifier 36 of the quantum process, if any, to which the corresponding qubit 18 has been allocated, a parent identifier 38 that identifies a parent quantum process, if any, of the quantum process to which the corresponding qubit 18 has been assigned, and a child identifier 40 that identifies a child quantum process, if any, of the quantum process to which the corresponding qubit 18 has been assigned. Each metadata record 28 may also include additional metadata 42 not relevant to the examples disclosed herein, such as metadata indicating a real-time state of the corresponding qubit 18, such as whether the qubit 18 is in an entangled state, is in superposition, or the like. While solely for purposes of illustration the quantum computing system 12 is described as having only twelve qubits 18, it is apparent that the quantum computing system 12 may have hundreds or thousands of qubits 18 in some implementations.

At the point in time illustrated in FIG. 1A, the qubits 18 are unallocated, and thus, the system availability status 30 for each metadata record 28 has a value of "A" indicating that the corresponding qubit 18 is available. The values of the other fields in the metadata records 28 are "NULL", which can comprise any value that indicates that the field is empty.

The quantum computing system 12 includes a QIZ controller 44 that, as described in greater detail below, operates to establish QIZs in which quantum processes execute and have access to allocated qubits 18, but no access or only controlled access to qubits 18 allocated to other QIZs. The quantum computing system 12 includes a task manager 46 that is configured to initiate a quantum process from a quantum program file, such as a quantum assembly language (QASM) file, or the like. In this example, a storage device 48 contains a plurality of QASM files 50-1-50-N, each of which includes quantum programming instructions that, when executed, implement a desired functionality.

The quantum computing system 12 may include a QIZ allocation user interface (UI) 52 that allows an operator 54 to interact with the QIZ controller 44 to establish a QIZ. The quantum computing system 12 may also include an operating system (OS) qubit interface 56 that is invoked when a quantum process attempts to read, write, or otherwise query a qubit 18. The OS qubit interface 56, in turn, communicates with the QIZ controller 44, or, in other implementations, the QIZ controller 44 may be integrated with the OS qubit interface 56.

Assume that the QIZ controller 44 receives a request from a requestor to allocate a first group of qubits 18 from available qubits 18 to establish a first QIZ that limits visibility of any quantum process associated with the first QIZ to only the qubits 18 in the first group of qubits 18. The request may identify the number of qubits 18 and, if applicable, other criteria, such as a particular type of qubit, or any other desired characteristics of the qubits 18.

In one example, the requestor may be the QIZ allocation UI 52 which makes the request in response to input from the operator 54. In another example, the request may be a programmatic request from a process executing on the quantum computing system 12 or elsewhere. In this example, the request indicated that six qubits 18 were to be allocated to the QIZ. The request may come directly to the QIZ controller 44, or indirectly via the OS qubit interface 56. The QIZ controller 44 accesses the qubit metadata 26 and identifies six qubits 18 that have a system availability status 30 that indicates the qubits 18 are available. In this example, the QIZ controller 44 determined that the six qubits 18-1-18-6 were available based on the system availability status 30 of the metadata records 28-1-28-6.

Figure 1B:
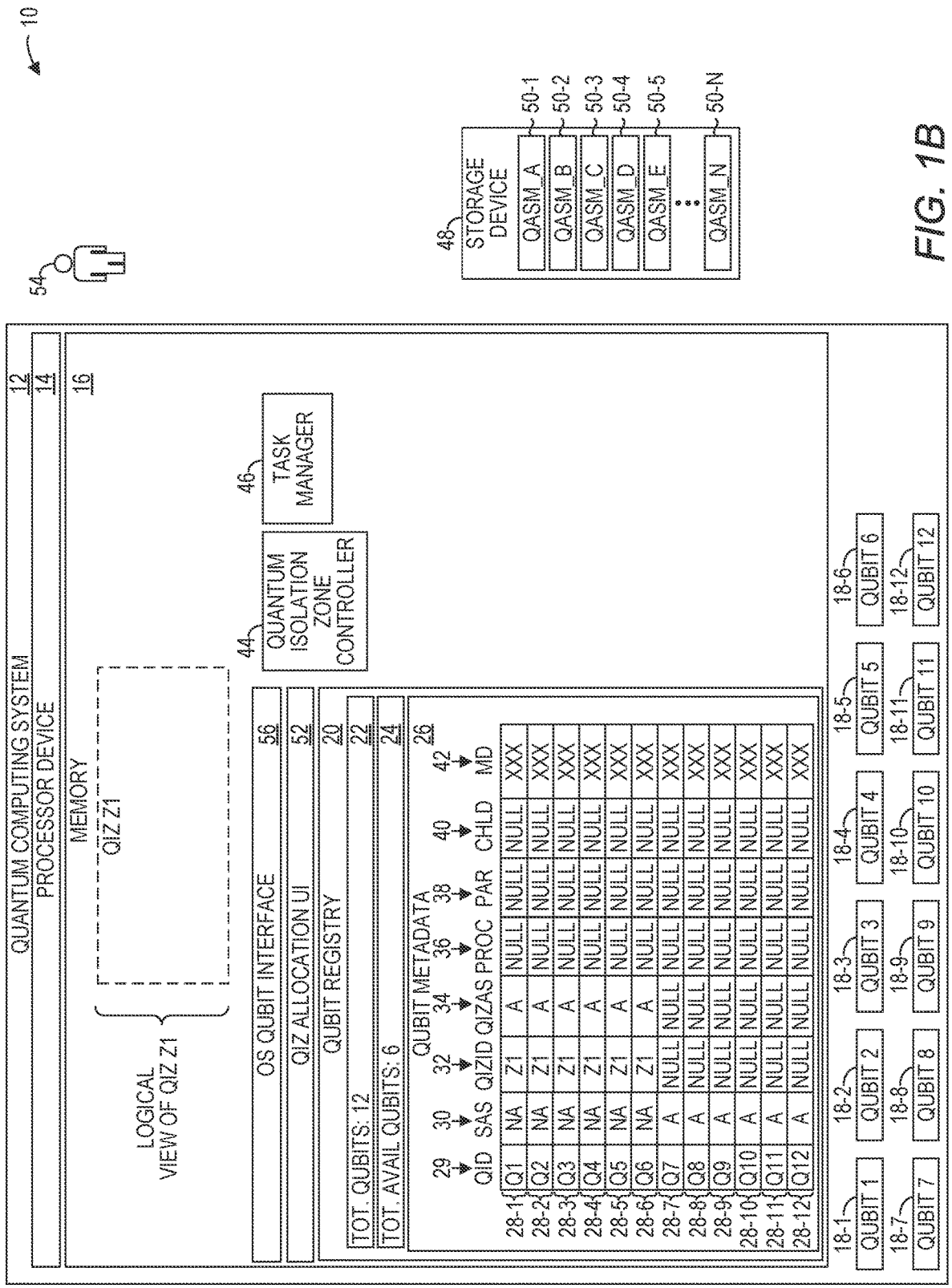

Referring now to FIG. 1B, the QIZ controller 44 modifies the system availability status 30 of the metadata rows 28-1-28-6 with a value of "NA" (not available) to indicate that the six qubits 18-1-18-6 are no longer available for allocation. The QIZ controller 44 obtains a unique QIZ identifier, in this example, "Z1", and modifies the QIZ ID 32 to indicate that the qubits 18-1-18-6 have been allocated to the QIZ Z1. The QIZ controller 44 may generate the unique QIZ ID or be provided the unique QIZ ID by the requestor or some other mechanism. The QIZ controller 44 modifies the QIZ availability status 34 to indicate that the qubits 18-1-18-6 are available for allocation within the QIZ Z1. The QIZ controller 44 modifies the total available qubits counter 24 to indicate that six qubits 18 (i.e., qubits 18-7-18-12) are now available for allocation to a QIZ.

For purposes of illustration, a logical QIZ Z1 is illustrated in dashed lines in the Figures to facilitate an understanding of the isolation and relationship aspects of QIZs implemented by the examples herein. However, it should be understood that the QIZ Z1 illustrated in the Figures in dashed outline is a logical depiction only provided for ease of understanding and that the functionality of the QIZ Z1 is implemented via the QIZ controller 44, the qubit metadata 26, and other components as described herein.

Assume that the task manager 46 receives a request to initiate a quantum process based on the QASM file 50-1 into the QIZ Z1. The request may be contained in a schedule, may be received programmatically, or may be initiated via input from the operator 54. The task manager 46 may access the QASM file 50-1 and parse the QASM file 50-1 to determine that, during execution, a quantum process initiated from the QASM file 50-1 will utilize two qubits 18. In other implementations, the number of qubits 18 to be allocated to the quantum process may be contained in the request to initiate the quantum process. The task manager 46 sends a request to the QIZ controller 44 for an allocation of two qubits 18 from the QIZ Z1. The QIZ controller 44 receives the request to allocate two qubits 18 in the QIZ Z1 to a quantum process that is, or will be, associated with the QIZ Z1. Based on the metadata records 28, the QIZ controller 44 determines that the qubits 18-1 and 18-2 are available for allocation within the QIZ Z1.

Figure 1C:
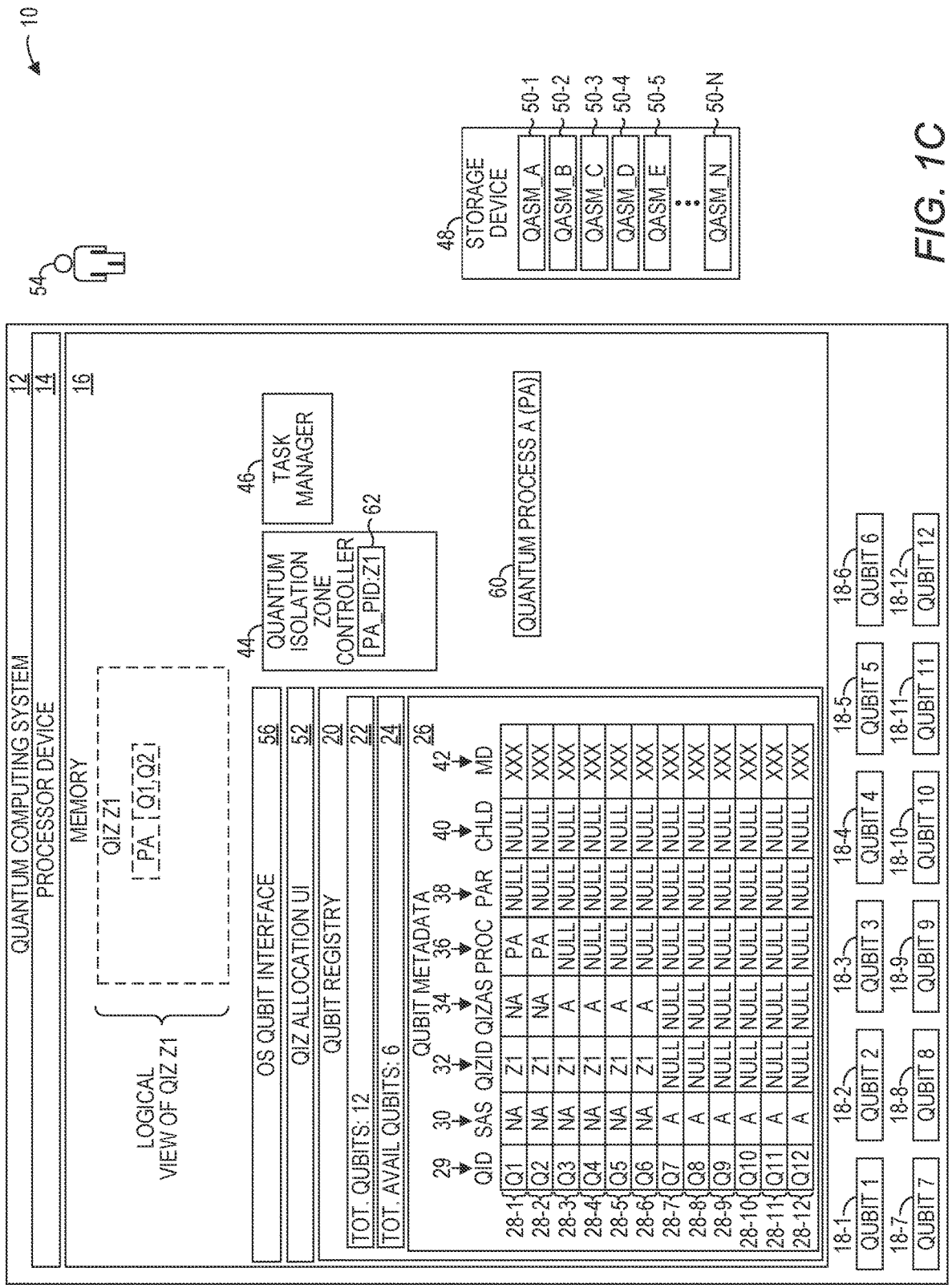

Referring now to FIG. 1C, the QIZ controller 44 modifies the QIZ availability status 34 of the metadata records 28-1 and 28-2 to indicate that the corresponding qubits 18-1 and 18-2 have been allocated and thus are no longer available for allocation (e.g., "NA"). The QIZ controller 44 provides the qubit IDs of the qubits 18-1 and 18-2 to the task manager 46. The task manager 46 initiates a quantum process 60 ("PA") into the QIZ Z1 with location/address information of the qubits 18-1 and 18-2. The task manager 46 provides a unique program ID (PID) of the quantum process 60 ("PA_PID") to the QIZ controller 44. The QIZ controller 44 maintains a mapping record 62 that maps the PID to the QIZ Z1. The quantum process 60 is now said to "execute in" or be "associated with" the QIZ Z1, because the visibility of and access to the qubits 18-1-18-12 is now constrained by the QIZ Z1.

As an example, assume that, at the point in time illustrated in FIG. 1C, the quantum process 60 issues a request to the OS qubit interface 56 to obtain a list of qubit IDs of all qubits 18 to which the quantum process 60 has access (i.e., read access and/or write access) or which are available for allocation. The OS qubit interface 56 communicates with the QIZ controller 44. The QIZ controller 44 determines the PID of the requestor, in this case the PID PA_PID, which is the PID of the quantum process 60. The QIZ controller 44 accesses the mapping record 62 and determines that the quantum process 60 is associated with the QIZ Z1. The QIZ controller 44 accesses the metadata records 28 and determines that the qubits 18-1-18-6 have been allocated to the QIZ Z1, and that the four qubits 18-3-18-6 are available. Because the qubits 18-1 and 18-2 have already been allocated to the quantum process 60, and the four qubits 18-3-18-6 are available, the QIZ controller 44 returns the qubit IDs of the qubits 18-1-18-6 to the quantum process 60 via the OS qubit interface 56, indicating that the quantum process 60 has access to the qubits 18-1 and 18-2 and that the qubits 18-3-18-6 are available for allocation. Thus, from the perspective of the quantum process 60, the quantum computing device 12 contains four available qubits 18, and the quantum process 60 is unaware of and unable to access (e.g., is isolated from) the actual additional available qubits 18-7-18-12.

Assume that, in response to the information that the qubits 18-3-18-6 are available, the quantum process 60 issues a request to the OS qubit interface 56 to have an additional qubit 18 allocated to the quantum process 60. The OS qubit interface 56 provides the request to the QIZ controller 44. The QIZ controller 44 then selects one of the qubits 18-3-18-6, modifies the appropriate metadata record 28 to indicate the qubit 18 is now allocated to the quantum process 60, and returns information to the quantum process 60 identifying the allocated qubit 18. Note that this is merely an example of a potential action that the quantum process 60 may take, and is thus not reflected in the metadata records 28 illustrated in FIG. 1C.

Figure 1D:
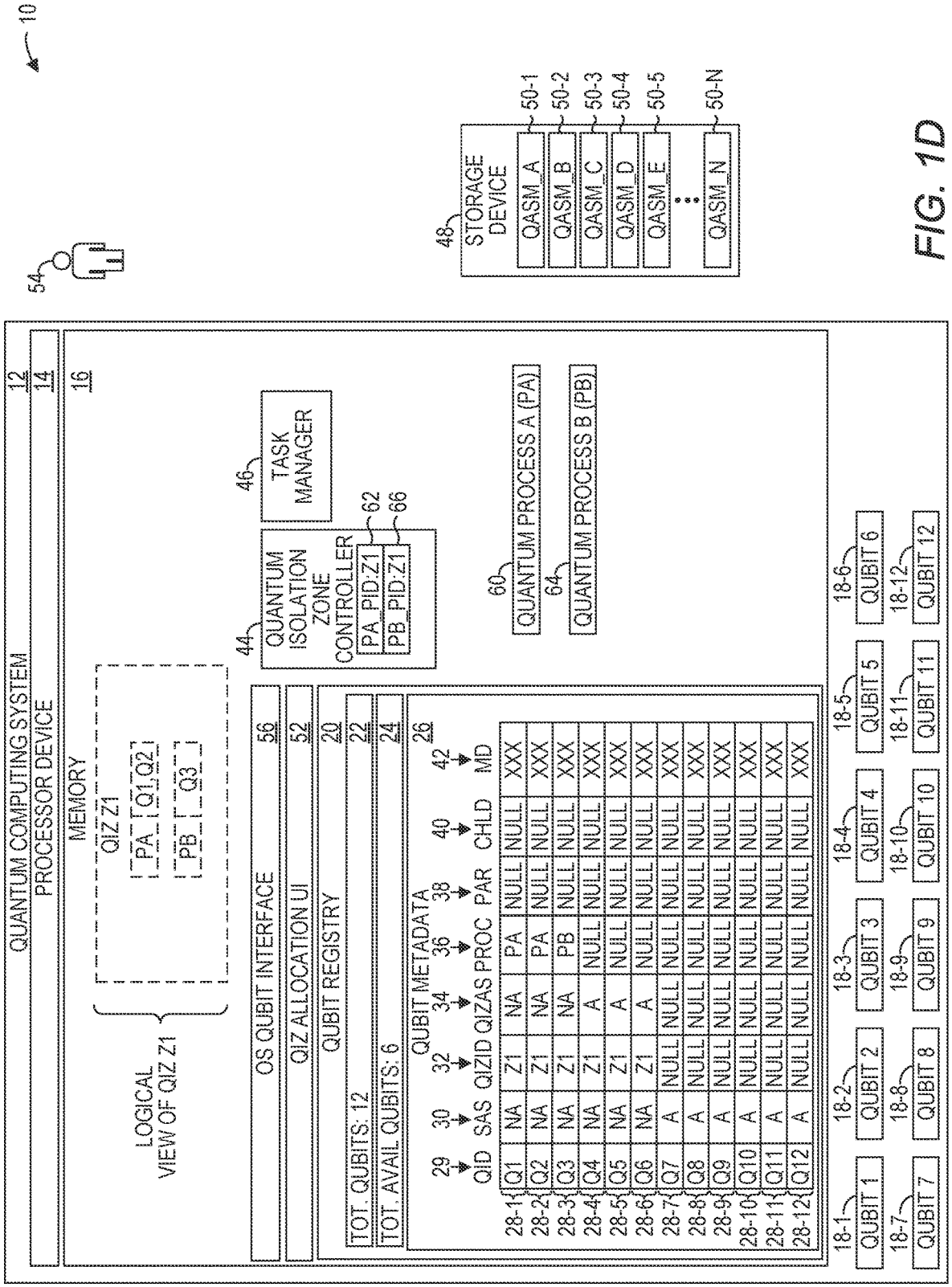

Assume that the task manager 46 receives a request to initiate a quantum process based on the QASM file 50-2 into the QIZ Z1. The task manager 46 may access the QASM file 50-2 and parse the QASM file 50-2 to determine that, during execution, the quantum process will utilize one qubit 18. The task manager 46 sends a request to the QIZ controller 44 for an allocation of one qubit 18 from the QIZ Z1. The QIZ controller 44 receives the request to allocate one qubit in the QIZ Z1 to a quantum process that is, or will be, associated with the QIZ Z1. Based on the metadata records 28, the QIZ controller 44 determines that the qubit 18-3 is available for allocation within the QIZ Z1. Referring now to FIG. 1D, the QIZ controller 44 modifies the QIZ availability status 34 of the metadata row 28-3 to indicate that the corresponding qubit 18-3 has been allocated and thus is no longer available for allocation (e.g., "NA").

The QIZ controller 44 provides the qubit ID of the qubit 18-3 to the task manager 46. The task manager 46 initiates a quantum process 64 ("PB") into the QIZ Z1 with location information of the qubit 18-3. The task manager 46 provides a unique PID of the quantum process 64 ("PB_PID") to the QIZ controller 44. The QIZ controller 44 maintains a mapping record 66 that maps the PID to the QIZ Z1. The quantum process 64 is now said to "execute in" or be "associated with" the QIZ Z1.

Assume that, at the point in time illustrated in FIG. 1D, subsequent to the allocation of the qubit 18-3 to the quantum process 64, the quantum process 60 issues a request to the OS qubit interface 56 to obtain a list of qubit IDs of all qubits 18 to which the quantum process 60 has access (i.e., read access and/or write access) and which are available for allocation. The OS qubit interface 56 communicates with the QIZ controller 44. The QIZ controller 44 determines the PID of the requestor, in this case the PID PA_PID, which is the PID of the quantum process 60. The QIZ controller 44 accesses the mapping record 62 and determines that the quantum process 60 is associated with the QIZ Z1. The QIZ controller 44 accesses the metadata records 28 and determines that the qubits 18-1-18-6 have been allocated to the QIZ Z1, the qubit 18-3 has been allocated to the quantum process 64, and that the three qubits 18-4-18-6 are available. Based on the metadata record 28-3, the QIZ controller 44 determines that the quantum process 64 is not related to the quantum process 60 because the parent identifier 38 and the child identifier 40 are NULL, indicating that the quantum process 60 has no parent process or child process at this time. Because the quantum process 60 and the quantum process 64 are unrelated, the quantum process 64 has no visibility to or access to qubits 18 allocated to the quantum process 60, and the quantum process 60 has no visibility to or access to qubits 18 allocated to the quantum process 64.

Because the qubit 18-3 has been allocated to the quantum process 64, and the three qubits 18-4-18-6 are available, the QIZ controller 44 returns the qubit IDs of the qubits 18-1, 18-2, 18-4-18-6 to the quantum process 60 via the OS qubit interface 56, indicating that the quantum process 60 has access to the qubits 18-1 and 18-2, and that the qubits 18-4-18-6 are available for allocation. The quantum process 60 is thus unaware of the qubit 18-3 or the qubits 18-7-18-12.

Figure 1E:
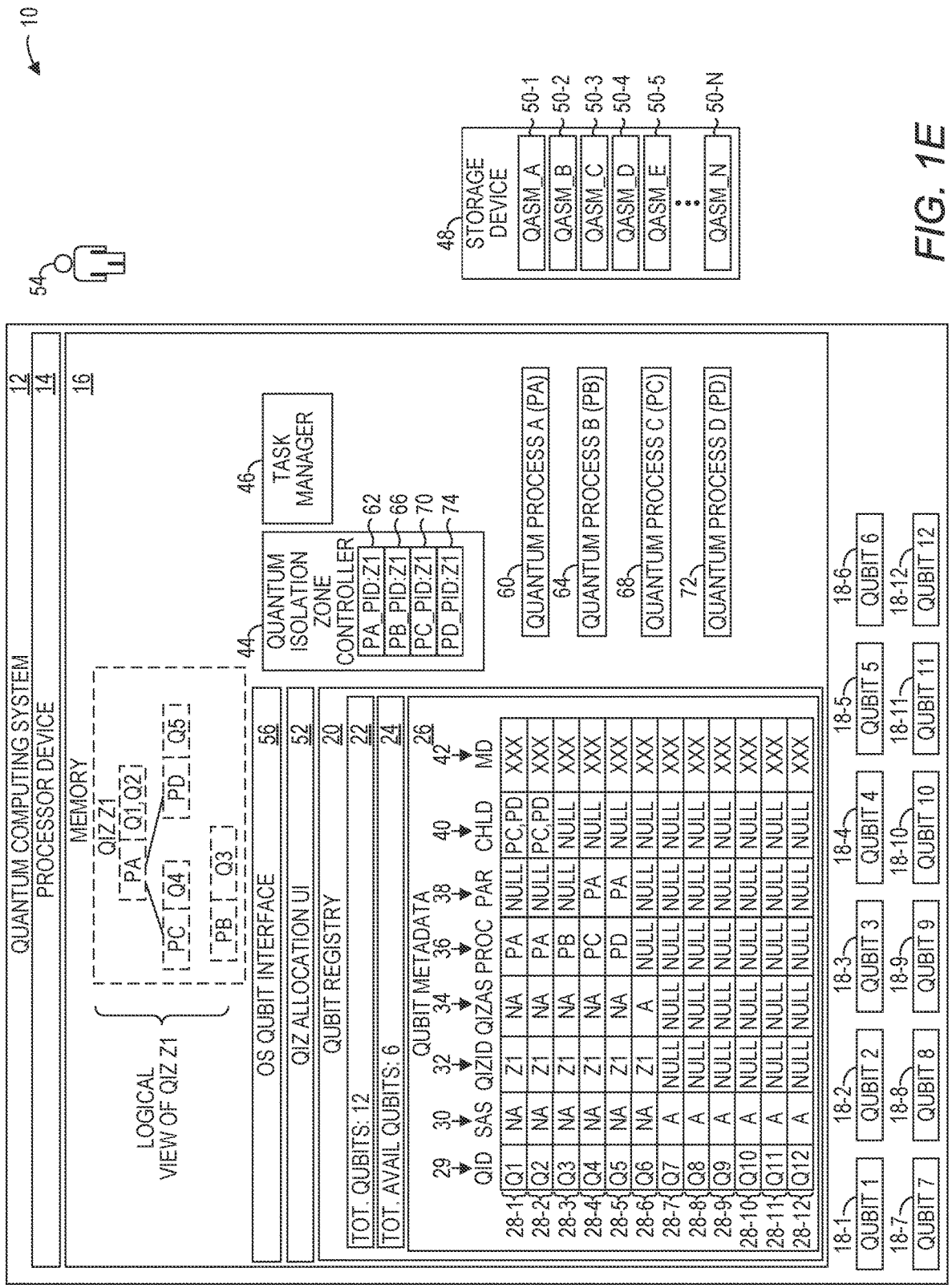

Referring now to FIG. 1E, a QIZ relationship graph that establishes relationships among quantum processes in a QIZ will be discussed. Assume that, in a manner similar to that discussed above with regard to the quantum processes 60 and 64, a quantum process 68 ("PC") is initiated from the QASM file 50-3 into the QIZ Z1 and allocated the qubit 18-4. The QIZ controller 44 generates a mapping record 70 that maps the PID of the quantum process 68 ("PC_PID") to the QIZ Z1. However, in this example, the quantum process 68 is identified as a child process of the quantum process 60. The designation may occur in any of several different manners. In one implementation, the task manager 46 may communicate to the QIZ controller 44 that the quantum process 68 is to be designated a child process of the quantum process 60. In another example, the request to initiate the quantum process 68 from the QASM file 50-3, and to allocate a qubit 18 to the quantum process 68, may originate from the quantum process 60. In this example, the act of the quantum process 60 requesting the initiation of the quantum process 68 by itself identifies the parent-child relationship.

The QIZ controller 44 modifies the QIZ availability status 34 of the metadata record 28-4 to indicate that the qubit 18-4 is no longer available for allocation. The QIZ controller 44 modifies the process identifier 36 of the metadata record 28-4 to indicate that the qubit 18-4 is allocated to the quantum process 68. The QIZ controller 44 modifies the parent identifier 38 of the metadata record 28-4 to indicate that the quantum process 60 is a parent process of the quantum process 68. The QIZ controller 44 modifies the child identifier 40 of the metadata records 28-1 and 28-2 to indicate that the quantum process 68 is a child process of the quantum process 60.

Assume further that a quantum process 72 ("PD") is initiated from the QASM file 50-4 into the QIZ Z1 and allocated the qubit 18-5. The QIZ controller 44 generates a mapping record 74 that maps the PID of the quantum process 72, PD_PID, to the QIZ Z1. In this example, the quantum process 72 is also identified as a child process of the quantum process 60.

The QIZ controller 44 modifies the QIZ availability status 34 of the metadata record 28-5 to indicate that the qubit 18-5 is no longer available for allocation. The QIZ controller 44 modifies the process identifier 36 of the metadata record 28-5 to indicate that the qubit 18-5 is allocated to the quantum process 72. The QIZ controller 44 modifies the parent identifier 38 of the metadata record 28-5 to indicate that the quantum process 60 is a parent process of the quantum process 72. The QIZ controller 44 modifies the child identifier 40 of the metadata records 28-1 and 28-2 to indicate that the quantum process 72 is a child process of the quantum process 60.

The metadata records 28-1, 28-2, 28-4 and 28-5 establish a relationship graph that appears, logically, as that illustrated in the logical view of the QIZ Z1 in FIG. 1E, such that the quantum process 60 is the parent process of the child quantum processes 68 and 72. As will be discussed herein, the relationship graph established in the metadata records 28-1, 28-2, 28-4, and 28-5 impacts the visibility of qubits 18 by the quantum processes 60, 68, and 72.

To illustrate the impact of the relationship graph in the QIZ Z1, assume that the quantum process 60 issues a request to the OS qubit interface 56 to obtain a list of qubit IDs of all qubits 18 to which the quantum process 60 has access (i.e., read access and/or write access) or which are available for allocation. The OS qubit interface 56 communicates with the QIZ controller 44. The QIZ controller 44 determines the PID of the requestor, in this case the PID PA_PID, which is the PID of the quantum process 60. The QIZ controller 44 accesses the mapping record 62 and determines that the quantum process 60 is associated with the QIZ Z1. The QIZ controller 44 accesses the metadata records 28 and determines that the qubits 18-1-18-6 have been allocated to the QIZ Z1, and that the qubit 18-6 is available. The QIZ controller 44 also determines that the qubits 18-1 and 18-2 have been allocated to the quantum process 60. The QIZ controller 44 determines that the quantum process 60 has two child processes executing in the QIZ Z1, the quantum processes 68 and 72. Because the quantum processes 68 and 72 are child processes of the quantum process 60, the quantum process 60 has access to the qubits 18-4 and 18-5 allocated to the quantum processes 68 and 72, respectively. The QIZ controller 44 returns the qubit IDs of the qubits 18-1, 18-2, and 18-4-18-6, indicating that the quantum process 60 has access to the qubits 18-1, 18-2, 18-4, and 18-5, and that the qubit 18-6 is available for allocation.

Assume next that the quantum process 68 issues a request to the OS qubit interface 56 to obtain a list of qubit IDs of all qubits 18 to which the quantum process 68 has access (i.e., read access and/or write access) or which are available for allocation. The OS qubit interface 56 communicates with the QIZ controller 44. The QIZ controller 44 determines the PID of the requestor, in this case the PID PC_PID, which is the PID of the quantum process 68. The QIZ controller 44 accesses the mapping record 70 and determines that the quantum process 68 is associated with the QIZ Z1. The QIZ controller 44 accesses the metadata records 28 and determines that the qubits 18-1-18-6 have been allocated to the QIZ Z1, and that the qubit 18-6 is available. The QIZ controller 44 also determines that the qubit 18-4 has been allocated to the quantum process 68. The QIZ controller 44 determines that the quantum process 68 has no child processes executing in the QIZ Z1, and that the quantum process 60 is a parent process of the quantum process 68. Because the quantum process 60 is a parent process of the quantum process 68, the quantum process 68 has access to the qubits 18-1 and 18-2 allocated to the quantum process 60. However, because the quantum process 72 is neither a parent process nor a child process of the quantum process 68, the quantum process 68 has no visibility to the qubit 18-5 allocated to the quantum process 72. The QIZ controller 44 returns the qubit IDs of the qubits 18-1, 18-2, 18-4 and 18-6, indicating that the quantum process 68 has access to the qubits 18-1, 18-2, and 18-4, and that the qubit 18-6 is available for allocation.

Figure 1F:
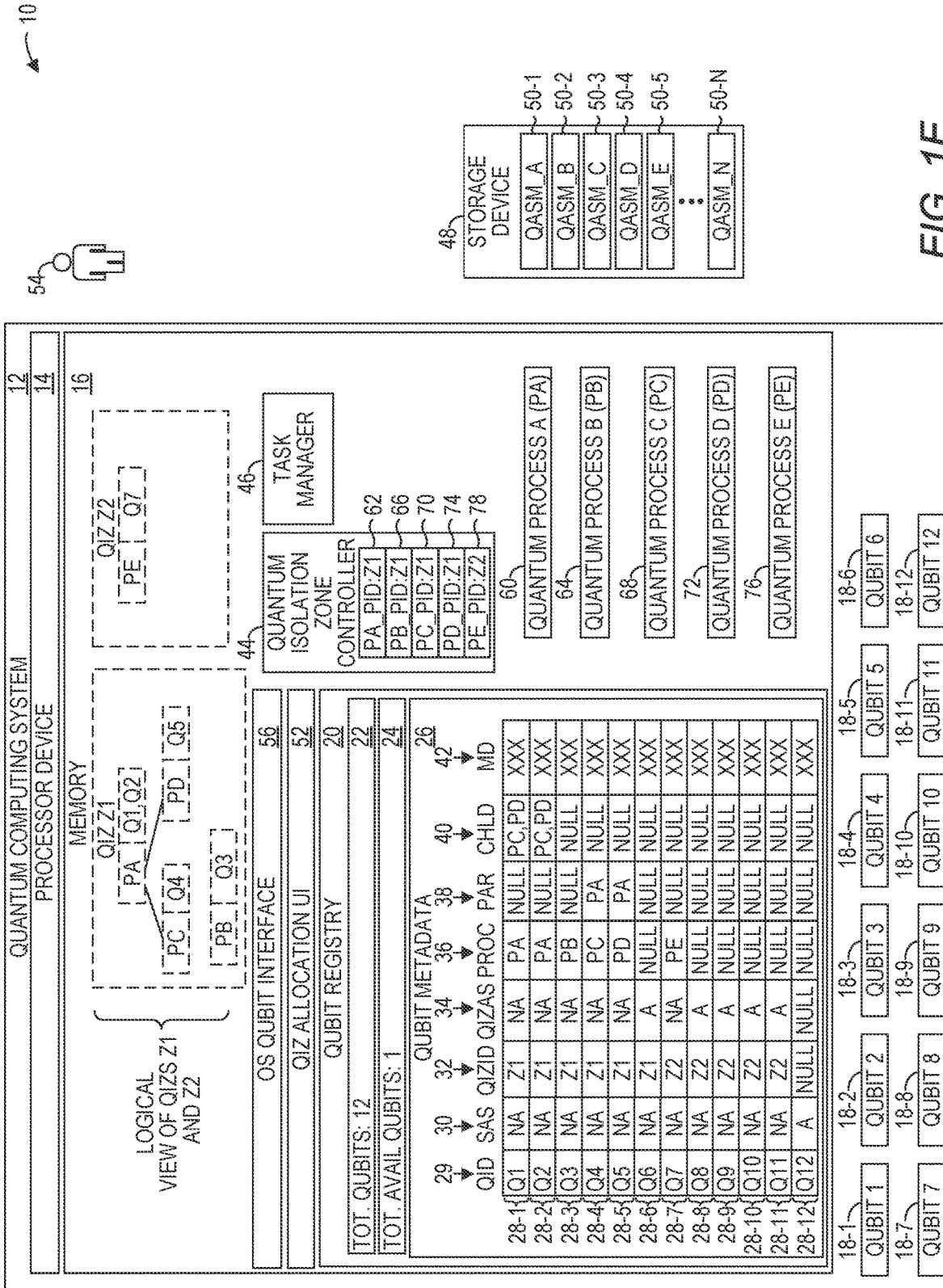

The QIZ controller 44 receives a request, from a requestor, to allocate a second group of qubits 18 from available qubits 18 to establish a second QIZ that limits visibility of any quantum process associated with the second QIZ to only the qubits 18 in the second group of qubits 18. In this example, the request indicates that five qubits 18 are to be allocated to the second QIZ. The QIZ controller 44 accesses the qubit metadata 26 and identifies five qubits 18 that have a system availability status 30 that indicates the qubits 18 are available. In this example, the QIZ controller 44 determines that the five qubits 18-7-18-11 are available based on the system availability status 30 of the metadata rows 28-7-28-11. Referring now to FIG. 1F, the QIZ controller 44 modifies the system availability status 30 of the metadata records 28-7-28-11 to indicate that the five qubits 18-7-18-11 are no longer available for allocation. The QIZ controller 44 obtains a unique QIZ identifier, in this example, "Z2", and modifies the QIZ ID 32 of the metadata records 28-7-28-11 to indicate that the qubits 18-7-18-11 have been allocated to the QIZ Z2. The QIZ controller 44 modifies the QIZ availability status 34 of the metadata records 28-7-28-11 to indicate that the qubits 18-7-18-11 are available for allocation within the QIZ Z2. The QIZ controller 44 modifies the total available qubits counter 24 to indicate that one qubit 18 (i.e., qubit 18-12) is now available for allocation to a QIZ.

Assume further that the task manager 46 receives a request to initiate a quantum process based on the QASM file 50-5 into the QIZ Z2. The task manager 46 may access the QASM file 50-5 and parse the QASM file 50-5 to determine that, during execution, the quantum process initiated from the QASM file 50-5 will utilize one qubit 18. The task manager 46 sends a request to the QIZ controller 44 for an allocation of one qubit 18 from the QIZ Z2. The QIZ controller 44 receives the request to allocate one qubit in the QIZ Z2 to a quantum process that is, or will be, associated with the QIZ Z2. Based on the metadata records 28, the QIZ controller 44 determines that the qubit 18-7 is available for allocation within the QIZ Z2 and modifies the QIZ availability status 34 of the metadata row 28-7 to indicate that the corresponding qubit 18-7 has been allocated and thus is no longer available for allocation (e.g., "NA").

The QIZ controller 44 provides the qubit ID of the qubit 18-7 to the task manager 46. The task manager 46 initiates a quantum process 76 ("PE") into the QIZ Z2 with location information of the qubit 18-7. The task manager 46 provides a unique program ID (PID) ("PE_PID") of the quantum process 76 to the QIZ controller 44. The QIZ controller 44 generates a mapping record 78 that maps the PID to the QIZ Z2. The quantum process 60 is now said to "execute in" or be "associated with" the QIZ Z2.

Assume that, at the point in time illustrated in FIG. 1F, the quantum process 76 issues a request to the OS qubit interface 56 to obtain a list of qubit IDs of all qubits 18 to which the quantum process 76 has access (i.e., read access and/or write access) or which are available for allocation. The OS qubit interface 56 communicates with the QIZ controller 44. The QIZ controller 44 determines the PID of the requestor, in this case the PID PE_PID, which is the PID of the quantum process 76. The QIZ controller 44 accesses the mapping record 78 and determines that the quantum process 76 is associated with the QIZ Z2. The QIZ controller 44 accesses the metadata records 28 and determines that the qubits 18-7-18-11 have been allocated to the QIZ Z2, and that the qubits 18-8-18-11 are available. Because the qubit 18-7 has already been allocated to the quantum process 76 and the four qubits 18-8-18-11 are available, the QIZ controller 44 returns the qubit IDs of the qubits 18-7-18-11 to the quantum process 76 via the OS qubit interface 56, indicating that the quantum process 76 has access to the qubit 18-7, and that the qubits 18-8-18-11 are available for allocation. Thus, from the perspective of the quantum process 76, the quantum computing device 12 contains four available qubits 18, and the quantum process 76 is unaware of and unable to access (e.g., is isolated from) the qubits 18-1-18-6 and 18-12.

It is noted that, because the QIZ controller 44 is a component of the quantum computing system 12, functionality implemented by the QIZ controller 44 may be attributed to the quantum computing system 12 generally. Moreover, in examples where the QIZ controller 44 comprises software instructions that program the processor device 14 to carry out functionality discussed herein, functionality implemented by the QIZ controller 44 may be attributed herein to the processor device 14.

Figure 2:
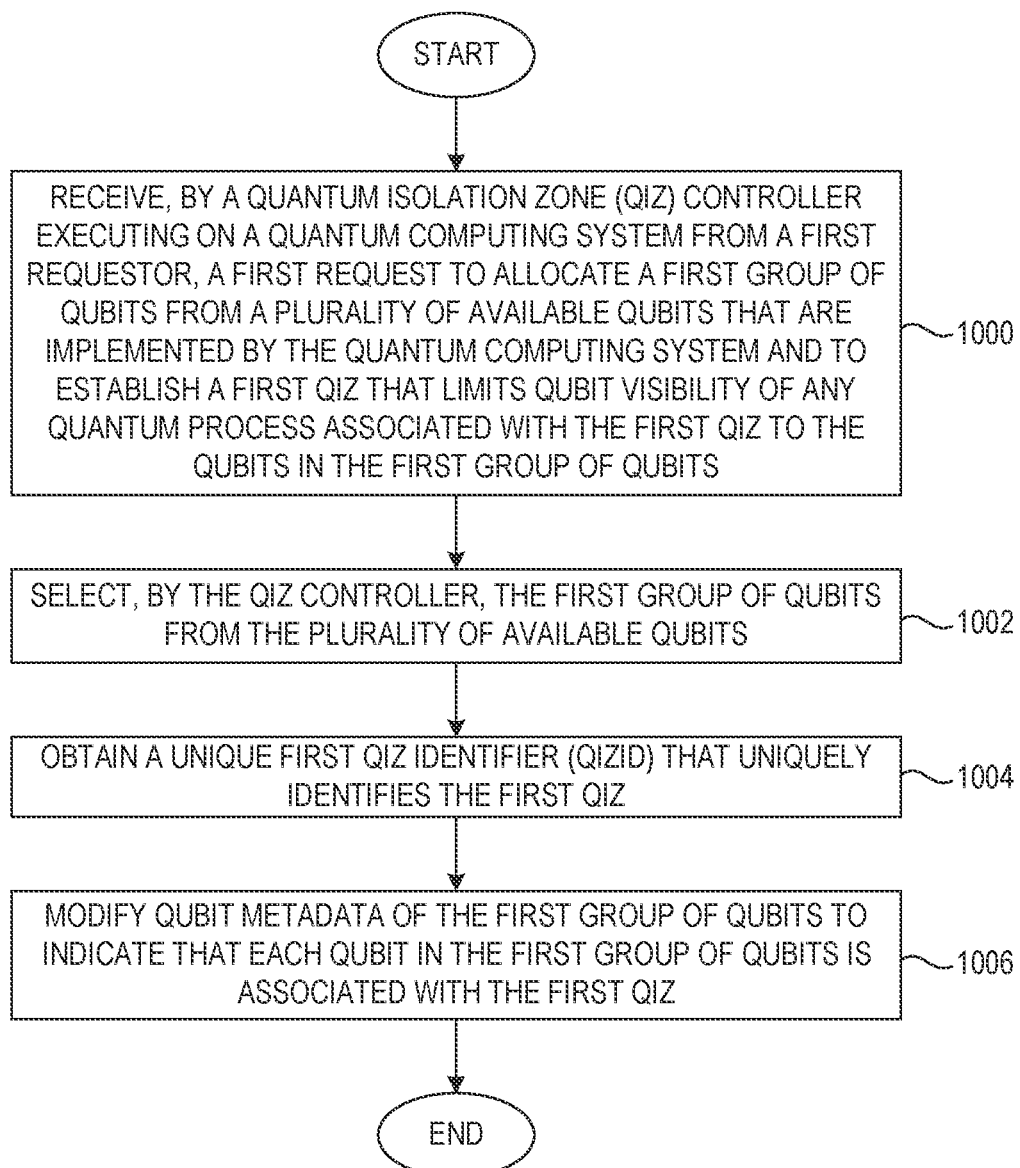
FIG. 2 is a flowchart of a method for implementing quantum isolation zones according to one implementation.

FIG. 2 is a flowchart of a method for implementing QIZs according to one implementation. FIG. 2 will be discussed in conjunction with FIGS. 1A-1F. The QIZ controller 44 receives, from a requestor, a request to allocate a group of the qubits 18 from the plurality of available qubits 18 that are implemented by the quantum computing system 12 and establish the QIZ Z1 that limits qubit visibility of any quantum process associated with the QIZ Z1 to only the qubits 18 in the group of qubits 18 (FIG. 2, block 1000). The QIZ controller 44 selects the first group of qubits 18-1-18-6 from the plurality of available qubits 18-1-18-12 (FIG. 2, block 1002). The QIZ controller 44 obtains the QIZ identifier (QIZID) Z1 that uniquely identifies the QIZ Z1 (FIG. 2, block 1004). The QIZ controller 44 modifies the qubit metadata 28-1-28-6 of the group of qubits 18-1-18-6 to indicate that each qubit 18 in the group of qubits 18-1-18-6 is associated with the QIZ Z1 (FIG. 2, block 1006).

Figure 3A:
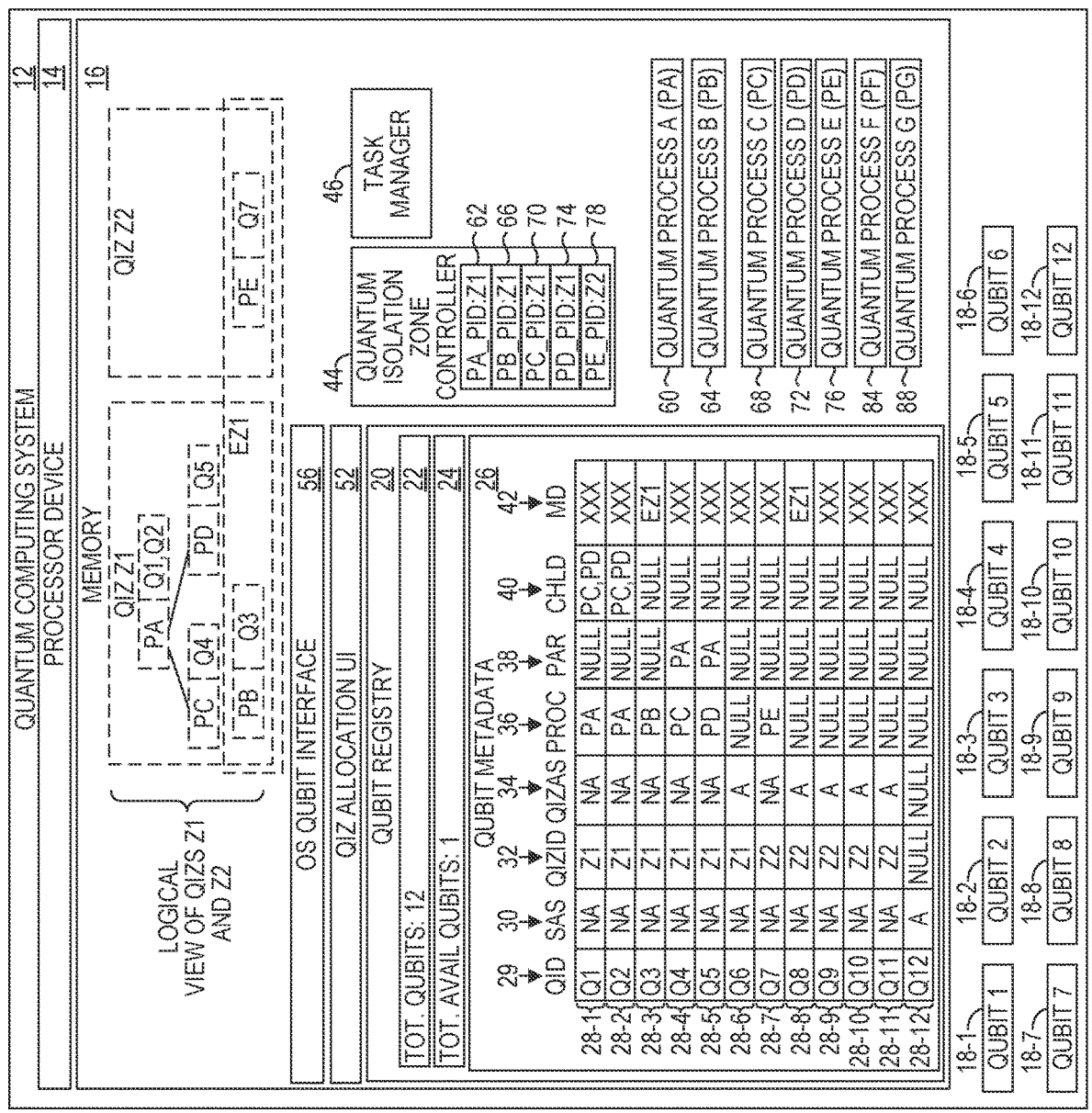
FIGS. 3A-3B are block diagrams illustrating the establishment of an entanglement zone according to one implementation.

FIG. 3A is a block diagram of the environment 10 according to another implementation. In this implementation, the QIZ controller 44 operates to establish entanglement zones that encompass qubits 18 that are allocated to different QIZs. As an example, the QIZ controller 44 may receive a request from a requestor to entangle the qubit 18-3 allocated to the quantum process 64 that executes in the QIZ Z1 and the qubit 18-7 allocated to the quantum process 76 that executes in the QIZ Z2. The request may come, by way of non-limiting example, from the QIZ allocation UI 52 in response to a user request, or from an executing process. The request may identify the qubits 18-3 and 18-7 or may identify the quantum processes 64 and 76. If the request identifies the quantum processes 64 and 76, the QIZ controller 44 accesses the qubit metadata 26 and determines that the processes 64 and 76 utilize the qubits 18-3 and 18-7, respectively.

The QIZ controller 44 accesses the qubit metadata entries 28-3 and 28-7. Based on the parent identifier 38 and the child identifier 40, the QIZ controller 44 determines that neither of the quantum processes 64 and 76 have parent processes or child processes. The QIZ controller 44 may access the additional metadata 42 to determine if either of the qubits 18-3 or 18-7 are already allocated to an entanglement zone. If so, the QIZ controller 44 rejects the request. If the qubits 18-3 or 18-7 are not already allocated to an entanglement zone, the QIZ controller 44 modifies the additional metadata 42 to establish an entanglement zone EZ1, logically illustrated in dashed lines to facilitate an understanding of the relationship between the entanglement zone EZ1 and the QIZs Z1 and Z2.

The QIZ controller 44 may than pause or terminate the quantum processes 64 and 76 to inhibit access of the qubits 18-3 and 18-7 by the quantum processes 64 and 76 while the qubits 18-3 and 18-7 are entangled. In some implementations, the QIZ controller 44 may access the QASM files 50-2 and 50-5 that implement the quantum processes 64 and 76, respectively, and modify the programming instructions to cause the quantum processes 64 and 76 to pause or otherwise halt.

The QIZ controller 44 then initiates an entanglement process 84 to entangle the qubits 18-3 and 18-7. The entanglement process 84 is not initiated in a QIZ and thus has access to both qubits 18-3 and 18-7. In one implementation, the QIZ controller 44 may initiate the entanglement process 84 from a predetermined QASM file 50-6 that, when initiated, receives as input a plurality of qubit identifiers, and performs an operation, such as a Hadamard gate operation, on the qubits identified by the qubit identifiers to cause the qubits to become entangled.

In another implementation, the request may include an entanglement process identifier, such as an identifier of a QASM file 50-7 that, when initiated as a process, entangles the identified qubits 18-3 and 18-7. In this implementation, the QIZ controller 44 causes the initiation of a quantum process 88 from the QASM file 50-7, passing into the quantum process 88 the qubit IDs of the qubits 18-3 and 18-7. The quantum process 88 is not initiated in a QIZ and thus has access to both qubits 18-3 and 18-7. The quantum process 88 performs an operation to cause the qubits 18-3 and 18-7 to become entangled and performs whatever other processing is desired.

Prior to termination of the entanglement zone EZ1, the QIZ controller 44 may receive another request to entangle the qubit 18-3 with another qubit 18. The QIZ controller 44 accesses the qubit metadata 26 and determines that the additional metadata 42 of the entry 28-3 that corresponds to the qubit 18-3 indicates that the qubit 18-3 is already allocated to an entanglement zone, and rejects the request.

At a subsequent point in time, the QIZ controller 44 determines that the entanglement zone EZ1 is to be terminated. This may be determined in any number of ways. In one example, a user may cause a message to be sent by the QIZ allocation UI 52 to terminate the entanglement zone EZ1. In another example, the quantum process 88 may send a message to the QIZ controller 44 directing the QIZ controller 44 to terminate the entanglement zone EZ1. In another example, the QIZ controller 44 may monitor the quantum process 88 and determine that the quantum process 88 has terminated, and in response, terminate the entanglement zone EZ1.

Figure 3B:
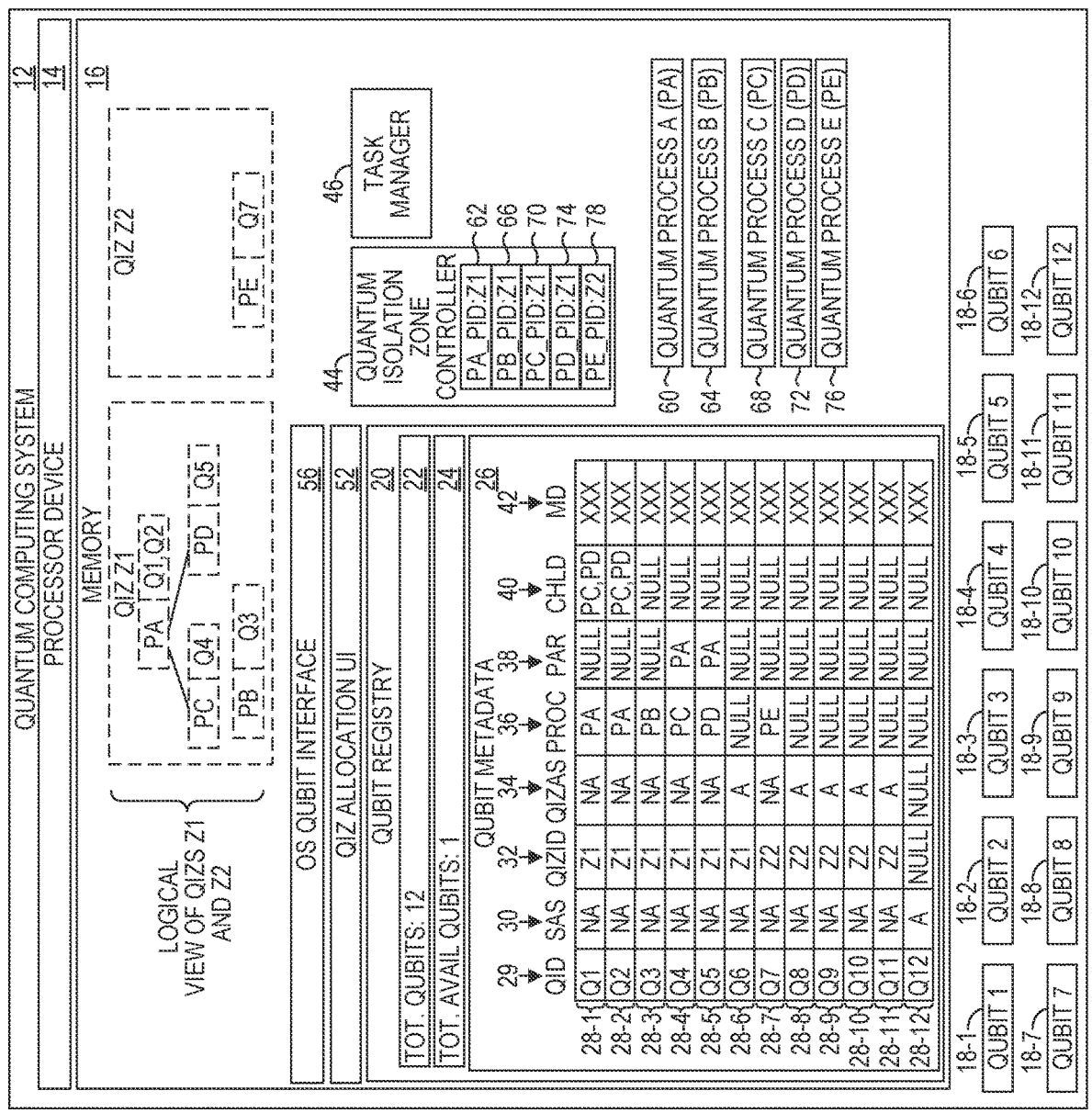

Referring now to FIG. 3B, the QIZ controller 44 modifies the qubit metadata 26 to remove the entanglement zone EZ1 that encompasses the qubits 18-3 and 18-7. In particular, the QIZ controller 44 modifies the additional metadata 42 to indicate that the entanglement zone EZ1 no longer exists. The QIZ controller 44 may automatically cause the quantum process 64 to continue execution, or restart execution. Similarly, the QIZ controller 44 may automatically cause the quantum process 76 to continue execution, or restart execution. The quantum processes 64 and 76 now have access to the data stored in the qubits 18-3 and 18-7 by the quantum process 88.

Figure 4:
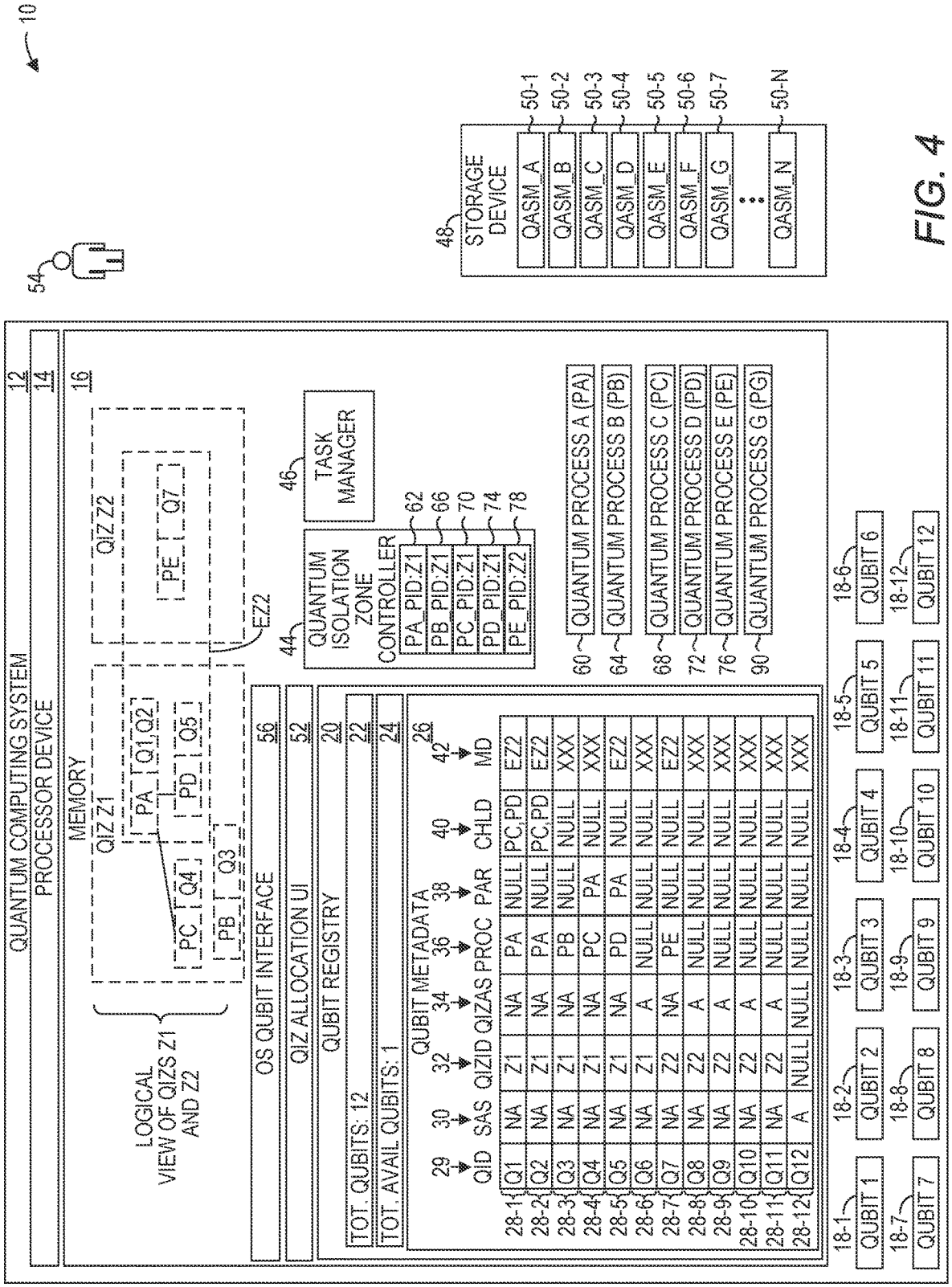
FIG. 4 is a block diagram illustrating the establishment of an entanglement zone according to another implementation.

FIG. 4 is a block diagram of the environment 10 according to another implementation. In this example, the QIZ controller 44 receives a request from a requestor to entangle the qubit 18-5 allocated to the quantum process 72 that executes in the QIZ Z1 and the qubit 18-7 allocated to the quantum process 76 that executes in the QIZ Z2. The request includes an identifier of the QASM file 50-7. The QIZ controller 44 accesses the qubit metadata entries 28-5 and 28-7. Based on the parent identifier 38 the QIZ controller 44 determines that the quantum process 72 has a parent process, the quantum process 60, but has no child process, and that the quantum process 76 has neither a parent process or a child process. The QIZ controller 44 also determines that neither of the qubits 18-5 or 18-7 are already allocated to an entanglement zone. The QIZ controller 44 modifies the additional metadata 42 to establish an entanglement zone EZ2, logically illustrated in dashed lines to facilitate an understanding of the relationship between the entanglement zone EZ2 and the QIZs Z1 and Z2. In this example, because the parent quantum process 60 has visibility and access rights to the qubit 18-5, the QIZ controller 44 includes the parent quantum process 60 in the entanglement zone EZ2 by modifying the additional metadata 42 of the metadata records 28-1 and 28-2 to prevent the parent quantum process 60 from accessing the qubit 18-5 while entangled.

The QIZ controller 44 may than pause or terminate the quantum processes 60, 72 and 76 to inhibit access of the qubits 18-5 and 18-7 by the quantum processes 60, 72 or 76 while the qubits 18-5 and 18-7 are entangled. In this example, the QIZ controller 44 then initiates an entanglement process 90 from the QASM file 50-7 to entangle the qubits 18-5 and 18-7. The quantum process 90 performs an operation to cause the qubits 18-5 and 18-7 to become entangled and performs whatever other processing is desired.

At a subsequent point in time, the QIZ controller 44 determines that the entanglement zone EZ2 is to be terminated. As discussed with regard to FIG. 3B, the QIZ controller 44 modifies the qubit metadata 26 to remove the entanglement zone EZ2 that encompasses the qubits 18-1, 18-2, 18-5 and 18-7. In particular, the QIZ controller 44 modifies the additional metadata 42 to indicate that the entanglement zone EZ2 has been terminated. The QIZ controller 44 may automatically then cause the quantum processes 60, 72 and 76 to continue execution, or restart execution. The quantum processes 60, 72 and 76 now have access to the data stored in the qubits 18-5 and 18-7 by the quantum process 90.

Figure 5A:
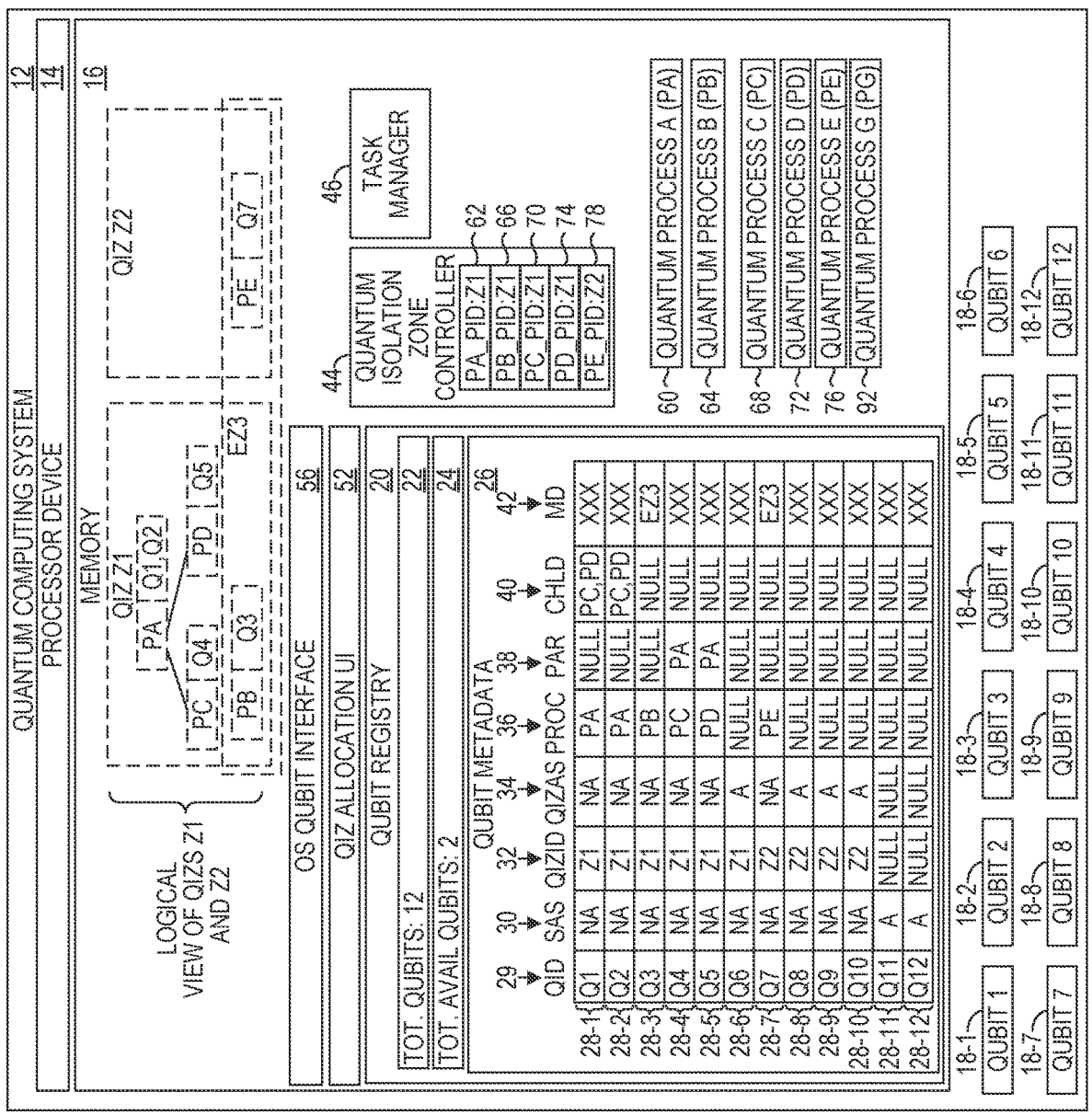
FIGS. 5A-5C are block diagrams illustrating the establishment of an entanglement zone according to another implementation.

FIG. 5A is a block diagram of the environment 10 according to another implementation. In this example, the qubits 18-8-18-10 have been allocated to the QIZ Z2, and the qubits 18-11-18-12 are unallocated. The QIZ controller 44 receives a request from a requestor to entangle the qubit 18-3 allocated to the quantum process 64 that executes in the QIZ Z1 and the qubit 18-7 allocated to the quantum process 76 that executes in the QIZ Z2. The request includes an identifier of the QASM file 50-7. The QIZ controller 44 accesses the qubit metadata entries 28-3 and 28-7. Based on the qubit metadata 26, the QIZ controller 44 determines that the quantum processes 64 and 72 have no parent or child processes. The QIZ controller 44 also determines that neither of the qubits 18-3 or 18-7 are already allocated to an entanglement zone. The QIZ controller 44 modifies the additional metadata 42 to establish an entanglement zone EZ3, logically illustrated in dashed lines to facilitate an understanding of the relationship between the entanglement zone EZ3 and the QIZs Z1 and Z2.

The QIZ controller 44 may than pause or terminate the quantum processes 64 and 76 to inhibit access of the qubits 18-3 and 18-7 by the quantum processes 64 or 76 while the qubits 18-3 and 18-7 are entangled. In this example, the QIZ controller 44 then initiates an entanglement quantum process 92 from the QASM file 50-7 to entangle the qubits 18-3 and 18-7. The quantum process 92 performs an operation to cause the qubits 18-3 and 18-7 to become entangled and performs whatever other processing is desired. In this example, the quantum process 92 sends a request to the QIZ controller 44 to allocate an additional qubit 18 to the QIZ 1 and an additional qubit 18 to the QIZ 2 for use by the quantum process 92.

Figure 5B:
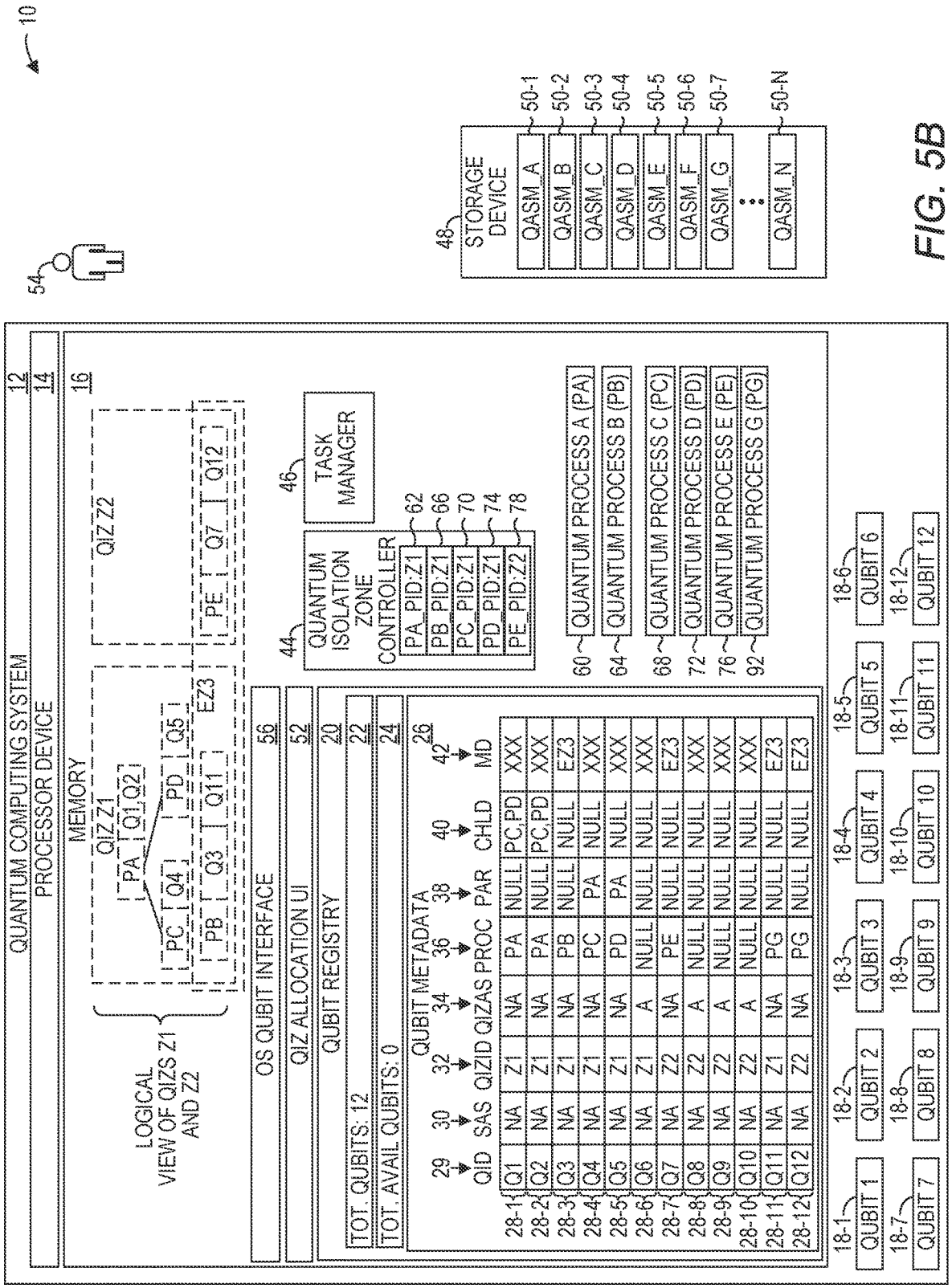

Referring now to FIG. 5B, the QIZ controller 44 determines that the qubit 18-11 is available and not allocated to a QIZ. The QIZ controller 44 modifies the metadata record 28-11 to allocate the qubit 18-11 to the QIZ Z1 and the entanglement zone EZ3, and to indicate that the qubit 18-11 is allocated to the quantum process 92. The QIZ controller 44 determines that the qubit 18-12 is available and not allocated to a QIZ. The QIZ controller 44 modifies the metadata record 28-12 to allocate the qubit 18-12 to the QIZ Z2 and the entanglement zone EZ3, and to indicate that the qubit 18-12 is allocated to the quantum process 92. The QIZ controller 44 provides the location/address information of the qubits 18-11 and 18-12 to the quantum process 92.

Figure 5C:
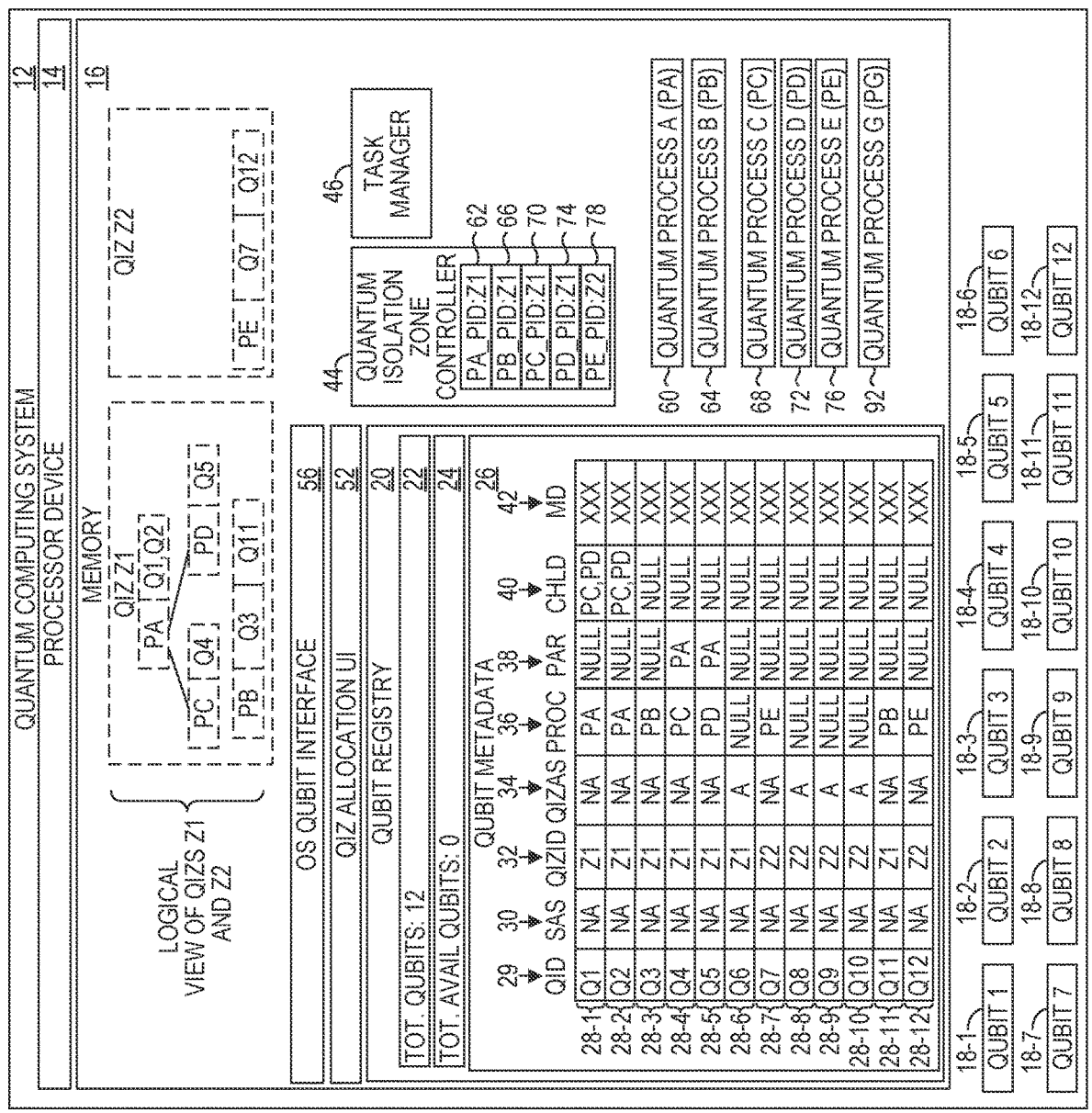

The quantum process 92 implements any desired processing and stores suitable data in the qubits 18-11 and 18-12. At a subsequent point in time the QIZ controller 44 determines that the entanglement zone EZ3 is to be terminated. Referring now to FIG. 5C, the QIZ controller 44 modifies the qubit metadata 26 to remove the entanglement zone EZ3 that encompasses the qubits 18-3, 18-7, 18-11 and 18-12. The QIZ controller 44 modifies the process identifier 36 of the metadata record 28-11 to indicate that the qubit 18-11 is now allocated to the quantum process 64. The QIZ controller 44 modifies the process identifier 36 of the metadata record 28-12 to indicate that the qubit 18-12 is now allocated to the quantum process 76.

The QIZ controller 44 may automatically then cause the quantum processes 64 and 76 to continue execution, or to restart execution. The QIZ controller 44 provides the location/address information of the qubit 18-11 to the quantum process 64. The QIZ controller 44 provides the location/address information of the qubit 18-12 to the quantum process 76. The quantum process 64 now has access the data stored in the qubits 18-3 and 18-11 by the quantum process 92, and the quantum process 76 now has access to the data stored in the qubits 18-7 and 18-12 by the quantum process 92.

Figure 6:
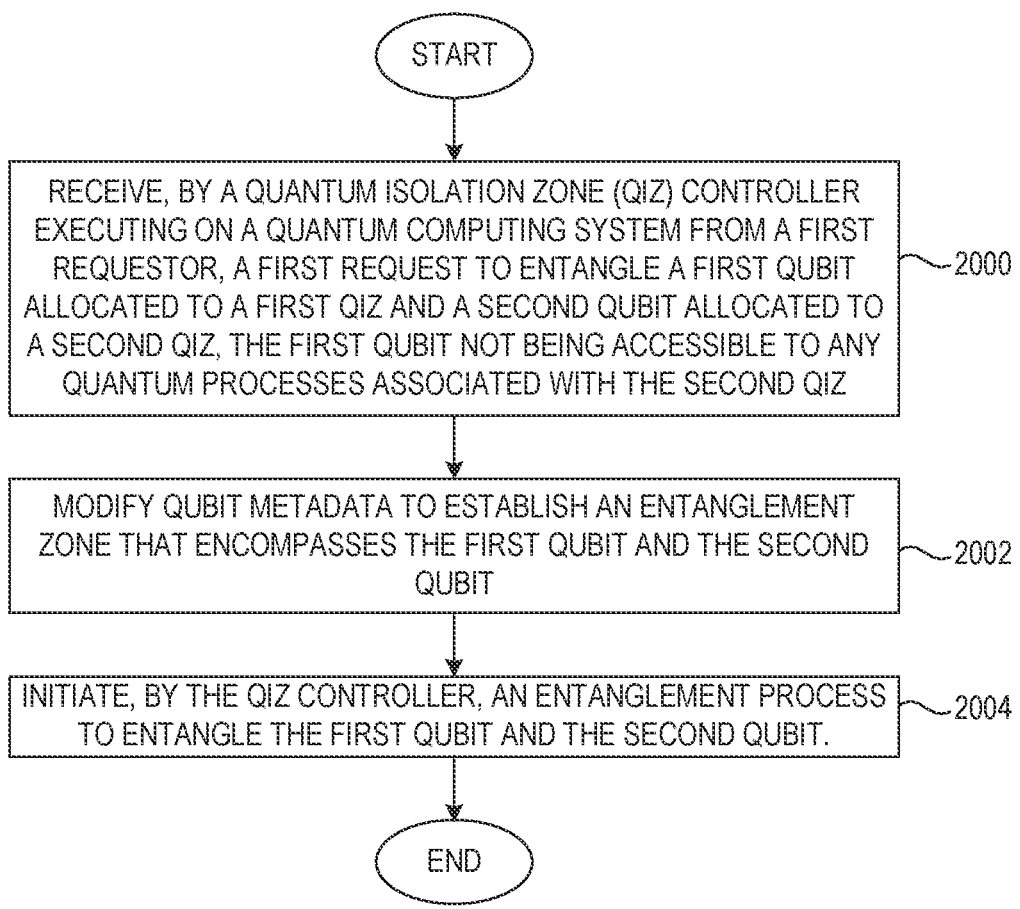
FIG. 6 is a flowchart of a method for entanglement of qubits allocated to different quantum isolation zones according to one implementation.

FIG. 6 is a flowchart of a method for entanglement of qubits allocated to different quantum isolation zones according to one implementation. FIG. 6 will be discussed in conjunction with FIGS. 3A-3B. The QIZ controller 44 receives, from a first requestor, a request to entangle the qubit 18-3 allocated to the QIZ Z1 and the qubit 18-7 allocated to the QIZ Z2, the qubit 18-3 not being accessible to any quantum processes associated with the QIZ Z2 (FIG. 6, block 2000). The QIZ controller 44 modifies the qubit metadata 26 to establish the entanglement zone EZ1 that encompasses the qubit 18-3 and the qubit 18-7 (FIG. 6, block 2002). The QIZ controller 44 initiates the entanglement process 88 to entangle the qubit 18-3 and the qubit 18-7 (FIG. 6, block 2004).

Figure 7:
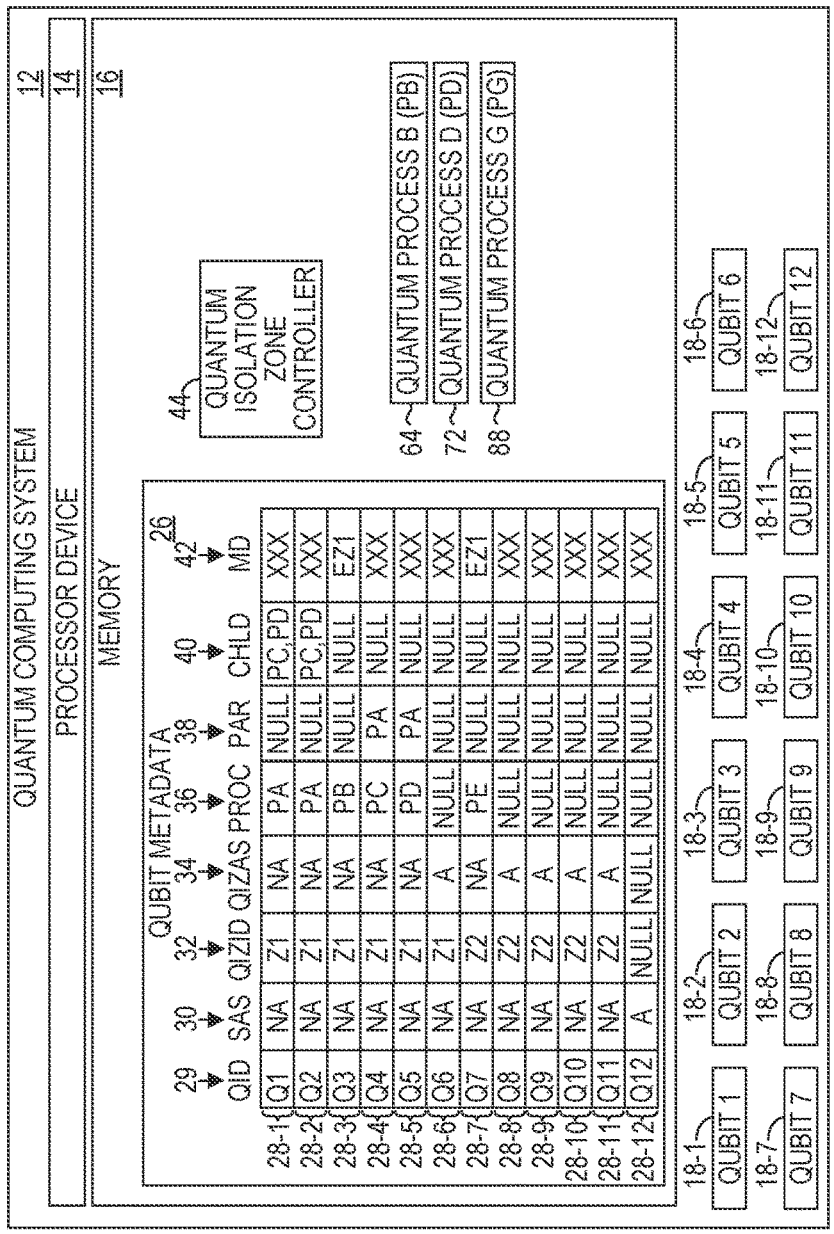
FIG. 7 is a simplified block diagram of the environment illustrated in FIGS. 3A-3B according to one implementation.

FIG. 7 is a simplified block diagram of the environment 10 illustrated in FIGS. 3A-3B according to one implementation. The quantum computing system 12 includes the memory 16 and the processor device 14 coupled to the memory 16. The processor device 14 is to receive, from a first requestor, a request to entangle the qubit 18-3 allocated to the QIZ Z1 and the qubit 18-7 allocated to the QIZ Z2, the qubit 18-3 not being accessible to any quantum processes associated with the QIZ Z2. The processor device 14 is to modify the qubit metadata 26 to establish the entanglement zone EZ1 that encompasses the qubit 18-3 and the qubit 18-7. The processor device 14 is to initiate an entanglement process to entangle the qubit 18-3 and the qubit 18-7.

Figure 8:
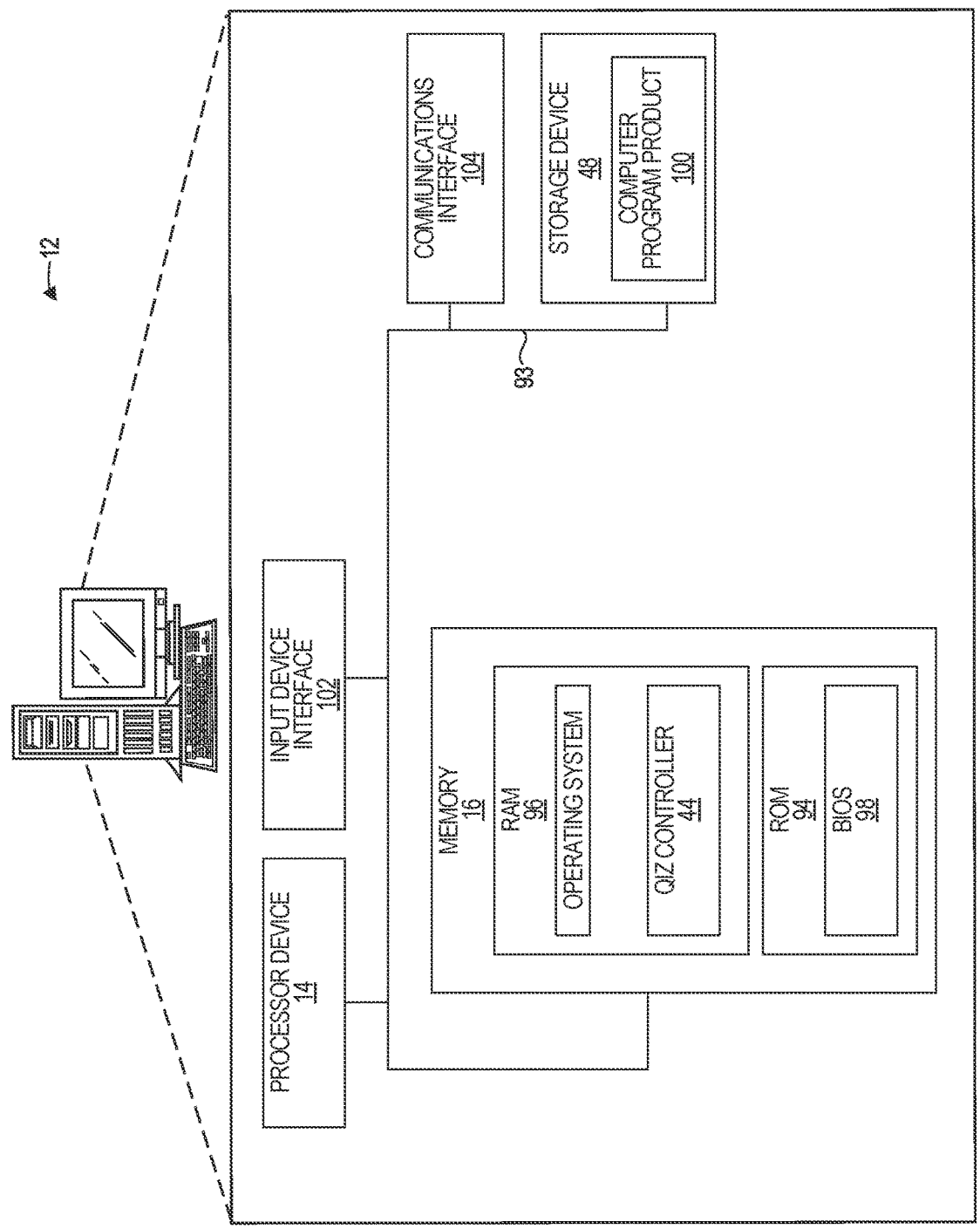
FIG. 8 is a block diagram of a quantum computing system suitable for implementing the examples disclosed herein.

FIG. 8 is a block diagram of the quantum computing system 12 suitable for implementing examples according to one example. The quantum computing system 12 may comprise any computing or electronic device capable of including firmware, hardware, and/or executing software instructions to implement the functionality described herein. The quantum computing system 12 includes the processor device 14, the system memory 16, and a system bus 93. The system bus 93 provides an interface for system components including, but not limited to, the system memory 16 and the processor device 14. The processor device 14 can be any commercially available or proprietary processor device.

The system bus 93 may be any of several types of bus structures that may further interconnect to a memory bus (with or without a memory controller), a peripheral bus, and/or a local bus using any of a variety of commercially available bus architectures. The system memory 16 may include non-volatile memory 94 (e.g., read-only memory (ROM), erasable programmable read-only memory (EPROM), electrically erasable programmable read-only memory (EEPROM), etc.), and volatile memory 96 (e.g., random-access memory (RAM)). A basic input/output system (BIOS) 98 may be stored in the non-volatile memory 94 and can include the basic routines that help to transfer information between elements within the quantum computing system 12. The volatile memory 96 may also include a high-speed RAM, such as static RAM, for caching data.

The quantum computing system 12 may further include or be coupled to a non-transitory computer-readable storage medium such as the storage device 48, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 48 and other drives associated with computer-readable media and computer-usable media may provide non-volatile storage of data, data structures, computer-executable instructions, and the like.

A number of modules can be stored in the storage device 48 and in the volatile memory 96, including an operating system and one or more program modules, such as the QIZ controller 44, which may implement the functionality described herein in whole or in part. All or a portion of the examples may be implemented as a computer program product 100 stored on a transitory or non-transitory computer-usable or computer-readable storage medium, such as the storage device 48, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the QIZ controller 44 in the volatile memory 96, may serve as a controller, or control system, for the quantum computing system 12 that is to implement the functionality described herein.

The operator 54 may also be able to enter one or more configuration commands through a keyboard (not illustrated), a pointing device such as a mouse (not illustrated), or a touch-sensitive surface such as a display device. Such input devices may be connected to the processor device 14 through an input device interface 102 that is coupled to the system bus 93 but can be connected by other interfaces such as a parallel port, an Institute of Electrical and Electronic Engineers (IEEE) 1394 serial port, a Universal Serial Bus (USB) port, an IR interface, and the like. The quantum computing system 12 may also include a communications interface 104 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
    receiving, by a quantum isolation zone (QIZ) controller executing on a quantum computing system from a first requestor, a first request to entangle a first qubit allocated to a first QIZ and a second qubit allocated to a second QIZ, the first qubit not being accessible to any quantum processes associated with the second QIZ;
    modifying qubit metadata to establish an entanglement zone that encompasses the first qubit and the second qubit; and
    initiating, by the QIZ controller, an entanglement process to entangle the first qubit and the second qubit.

2. The method of claim 1 further comprising:
    prior to modifying the qubit metadata to establish the entanglement zone, determining that the first qubit and the second qubit are not in an entanglement zone.

3. The method of claim 1 further comprising:
    prior to initiating the entanglement process, pausing execution of a first quantum process to which the first qubit has been allocated; and
    prior to initiating the entanglement process, pausing execution of a second quantum process to which the second qubit has been allocated.

4. The method of claim 3 further comprising:
    determining, based on the qubit metadata, that the first quantum process has a parent quantum process that has access rights to the first qubit; and
    prior to initiating the entanglement process, pausing execution of the parent quantum process.

5. The method of claim 1 further comprising:
    determining that the entanglement zone is to be terminated; and
    modifying the qubit metadata to remove the entanglement zone that encompasses the first qubit and the second qubit.

6. The method of claim 1 further comprising:
    prior to initiating the entanglement process, pausing execution of a first quantum process to which the first qubit has been allocated;
    prior to initiating the entanglement process, pausing execution of a second quantum process to which the second qubit has been allocated;
    determining that the entanglement zone is to be terminated;
    causing the first quantum process to restart execution; and
    causing the second quantum process to restart execution.

7. The method of claim 1 wherein the request identifies a quantum assembly language (QASM) file and wherein initiating the entanglement process comprises initiating a quantum process from the QASM file.

8. The method of claim 1 further comprising:
    receiving, by the QIZ controller, a second request to entangle the first qubit and another qubit allocated to another QIZ;
    accessing, by the QIZ controller, the qubit metadata;
    determining, by the QIZ controller, that the first qubit is encompassed by the entanglement zone; and
    in response to determining that the first qubit is encompassed by the entanglement zone, rejecting the second request.

9. A quantum computing system comprising:
    a memory; and
    a processor device coupled to the memory to:
        receive, from a first requestor, a first request to entangle a first qubit allocated to a first QIZ and a second qubit allocated to a second QIZ, the first qubit not being accessible to any quantum processes associated with the second QIZ;
        modify qubit metadata to establish an entanglement zone that encompasses the first qubit and the second qubit; and
        initiate, by the QIZ controller, an entanglement process to entangle the first qubit and the second qubit.

10. The quantum computing system of claim 9 wherein the processor device is further to:
    prior to modifying the qubit metadata to establish the entanglement zone, determine that the first qubit and the second qubit are not in an entanglement zone.

11. The quantum computing system of claim 9 wherein the processor device is further to:
    prior to initiating the entanglement process, pause a first quantum process to which the first qubit has been allocated; and
    prior to initiating the entanglement process, pause execution of a second quantum process to which the second qubit has been allocated.

12. The quantum computing system of claim 11 wherein the processor device is further to:
    determine, based on the qubit metadata, that the first quantum process has a parent quantum process that has access rights to the first qubit; and
    prior to initiating the entanglement process, pause execution of the parent quantum process.

13. The quantum computing system of claim 9 wherein the processor device is further to:
    prior to initiating the entanglement process, pause execution of a first quantum process to which the first qubit has been allocated;
    prior to initiating the entanglement process, pause execution of a second quantum process to which the second qubit has been allocated;
    determine that the entanglement zone is to be terminated;
    cause the first quantum process to restart execution; and
    cause the second quantum process to restart execution.

14. The quantum computing system of claim 9 wherein the processor device is further to:
    receive a second request to entangle the first qubit and another qubit allocated to another QIZ;
    access the qubit metadata;
    determine that the first qubit is encompassed by the entanglement zone; and
    in response to determining that the first qubit is encompassed by the entanglement zone, reject the second request.

15. A non-transitory computer-readable storage medium that includes executable instructions configured to cause a processor device on a quantum computing system to:
- receive, from a first requestor, a first request to entangle a first qubit allocated to a first QIZ and a second qubit allocated to a second QIZ, the first qubit not being accessible to any quantum processes associated with the second QIZ;
- modify qubit metadata to establish an entanglement zone that encompasses the first qubit and the second qubit; and
- initiate, by the QIZ controller, an entanglement process to entangle the first qubit and the second qubit.

16. The non-transitory computer-readable storage medium of claim 15 wherein the instructions further cause the processor device to:
- prior to modifying the qubit metadata to establish the entanglement zone, determine that the first qubit and the second qubit are not in an entanglement zone.

17. The non-transitory computer-readable storage medium of claim 15 wherein the instructions further cause the processor device to:
- prior to initiating the entanglement process, pause execution of a first quantum process to which the first qubit has been allocated; and
- prior to initiating the entanglement process, pause execution of a second quantum process to which the second qubit has been allocated.

18. The non-transitory computer-readable storage medium of claim 17 wherein the processor device is further to:
- determine, based on the qubit metadata, that the first quantum process has a parent quantum process that has access rights to the first qubit; and
- prior to initiating the entanglement process, pause execution of the parent quantum process.

19. The non-transitory computer-readable storage medium of claim 15 wherein the instructions further cause the processor device to:
- prior to initiating the entanglement process, pause execution of a first quantum process to which the first qubit has been allocated; and
- prior to initiating the entanglement process, pause execution of a second quantum process to which the second qubit has been allocated;
- determine that the entanglement zone is to be terminated;
- cause the first quantum process to restart execution; and
- cause the second quantum process to restart execution.

20. The non-transitory computer-readable storage medium of claim 15 wherein the instructions further cause the processor device to:
- receive a second request to entangle the first qubit and another qubit allocated to another QIZ;
- access the qubit metadata;
- determine that the first qubit is encompassed by the entanglement zone; and
- in response to determining that the first qubit is encompassed by the entanglement zone, reject the second request.

* * * * *